United States Patent
MacDonald et al.

(10) Patent No.: US 8,319,819 B2
(45) Date of Patent: Nov. 27, 2012

(54) VIRTUAL ROUND-TABLE VIDEOCONFERENCE

(75) Inventors: Alan J. MacDonald, Malvern, PA (US); J. William Mauchly, Berwyn, PA (US); David W. Sowa, Exton, PA (US); Joseph T. Friel, Ardmore, PA (US)

(73) Assignee: Cisco Technology, Inc., San Jose, CA (US)

( * ) Notice: Subject to any disclaimer, the term of this patent is extended or adjusted under 35 U.S.C. 154(b) by 1234 days.

(21) Appl. No.: 12/055,861

(22) Filed: Mar. 26, 2008

(65) Prior Publication Data

US 2009/0244257 A1 Oct. 1, 2009

(51) Int. Cl.
*H04N 7/14* (2006.01)

(52) U.S. Cl. ................... 348/14.09; 348/14.01

(58) Field of Classification Search .... 348/14.01–14.16; 379/201.01, 202.01; 370/260–271
See application file for complete search history.

(56) References Cited

U.S. PATENT DOCUMENTS

| | | | |
|---|---|---|---|
| 2,911,462 A | 11/1959 | Brady | |
| 3,793,489 A | 2/1974 | Sank | |
| 3,909,121 A | 9/1975 | De Mesquita Cardoso | |
| 4,400,724 A | 8/1983 | Fields | |
| 4,473,285 A | 9/1984 | Winter | |
| 4,494,144 A | 1/1985 | Brown | |
| 4,750,123 A | 6/1988 | Christian | |
| 4,815,132 A | 3/1989 | Minami | |
| 4,827,253 A | 5/1989 | Maltz | |
| 4,853,764 A | 8/1989 | Sutter | |
| 4,890,314 A | 12/1989 | Judd et al. | |
| 4,961,211 A | 10/1990 | Tsugane et al. | |
| 5,003,532 A | 3/1991 | Ashida et al. | |
| 5,020,098 A | 5/1991 | Celli | |
| 5,136,652 A | 8/1992 | Jibbe et al. | |
| 5,187,571 A | 2/1993 | Braun et al. | |
| 5,200,818 A | 4/1993 | Neta et al. | |
| 5,249,035 A | 9/1993 | Yamanaka | |
| 5,255,211 A | 10/1993 | Redmond | |
| 5,268,734 A | 12/1993 | Parker et al. | |

(Continued)

FOREIGN PATENT DOCUMENTS

CN 101953158 A 1/2011

(Continued)

OTHER PUBLICATIONS

U.S. Appl. No. 12/781,722, filed May 17, 2010, entitled "System and Method for Providing Retracting Optics in a Video Conferencing Environment," Inventor(s): Joseph T. Friel, et al.

(Continued)

*Primary Examiner* — Brian Ensey
(74) *Attorney, Agent, or Firm* — Patent Capital Group (57) ABSTRACT

A system and method for creating a virtual round table videoconference is described. An embodiment of the system comprises a plurality of displays arranged in an arc configuration with a table to create a virtual round table. Cameras are arranged around the plurality of displays such that when a participant looks at a display with an image of a remote participant, the camera associated with the display captures an image of the participant's gaze, making eye contact with the camera. The image is displayed at the remote participant's endpoint creating the effect of eye contact between the participants. In another embodiment, audio speakers are arranged to provide directional sound such that the video source for a display and the audio source for the associated speaker are from the same endpoint.

19 Claims, 5 Drawing Sheets

U.S. PATENT DOCUMENTS

| | | | |
|---|---|---|---|
| 5,317,405 A | 5/1994 | Kuriki et al. |
| 5,337,363 A | 8/1994 | Platt |
| 5,347,363 A | 9/1994 | Yamanaka |
| 5,359,362 A | 10/1994 | Lewis et al. |
| D357,468 S | 4/1995 | Rodd |
| 5,406,326 A | 4/1995 | Mowry |
| 5,423,554 A | 6/1995 | Davis |
| 5,446,834 A | 8/1995 | Deering |
| 5,448,287 A | 9/1995 | Hull |
| 5,467,401 A | 11/1995 | Nagamitsu et al. |
| 5,495,576 A | 2/1996 | Ritchey |
| 5,502,481 A | 3/1996 | Dentinger et al. |
| 5,502,726 A | 3/1996 | Fischer |
| 5,532,737 A | 7/1996 | Braun |
| 5,541,639 A | 7/1996 | Takatsuki et al. |
| 5,541,773 A | 7/1996 | Kamo et al. |
| 5,570,372 A | 10/1996 | Shaffer |
| 5,572,248 A | 11/1996 | Allen et al. |
| 5,625,410 A | 4/1997 | Washino et al. |
| 5,666,153 A | 9/1997 | Copeland |
| 5,675,374 A | 10/1997 | Kohda |
| 5,715,377 A | 2/1998 | Fukushima et al. |
| D391,935 S | 3/1998 | Sakaguchi et al. |
| 5,729,471 A | 3/1998 | Jain et al. |
| 5,737,011 A | 4/1998 | Lukacs |
| 5,748,121 A | 5/1998 | Romriell |
| 5,760,826 A | 6/1998 | Nayar |
| 5,790,182 A | 8/1998 | Hilaire |
| 5,796,724 A | 8/1998 | Rajamani et al. |
| 5,815,196 A | 9/1998 | Alshawi |
| 5,818,514 A | 10/1998 | Duttweiler et al. |
| 5,821,985 A | 10/1998 | Iizawa |
| D410,447 S | 6/1999 | Chang |
| 5,940,118 A | 8/1999 | Van Schyndel |
| 5,940,530 A | 8/1999 | Fukushima et al. |
| 5,953,052 A | 9/1999 | McNelley et al. |
| 5,956,100 A | 9/1999 | Gorski |
| 6,101,113 A | 8/2000 | Paice |
| 6,124,896 A | 9/2000 | Kurashige |
| 6,148,092 A | 11/2000 | Qian |
| 6,167,162 A | 12/2000 | Jacquin et al. |
| 6,172,703 B1 | 1/2001 | Lee |
| 6,173,069 B1 | 1/2001 | Daly et al. |
| 6,226,035 B1 | 5/2001 | Korein et al. |
| 6,243,130 B1 | 6/2001 | McNelley et al. |
| 6,249,318 B1 | 6/2001 | Girod et al. |
| 6,256,400 B1 | 7/2001 | Takata et al. |
| 6,266,082 B1 | 7/2001 | Yonezawa et al. |
| 6,285,392 B1 * | 9/2001 | Satoda et al. ............... 348/14.09 |
| 6,292,575 B1 | 9/2001 | Bortolussi et al. |
| 6,356,589 B1 | 3/2002 | Gebler et al. |
| 6,424,377 B1 | 7/2002 | Driscoll, Jr. |
| 6,430,222 B1 | 8/2002 | Okadia |
| 6,459,451 B2 | 10/2002 | Driscoll et al. |
| 6,493,032 B1 | 12/2002 | Wallerstein et al. |
| 6,507,356 B1 | 1/2003 | Jackel et al. |
| 6,577,333 B2 | 6/2003 | Tai et al. |
| 6,583,808 B2 | 6/2003 | Boulanger et al. |
| 6,590,603 B2 | 7/2003 | Sheldon et al. |
| 6,591,314 B1 | 7/2003 | Colbath |
| 6,593,955 B1 | 7/2003 | Falcon |
| 6,593,956 B1 | 7/2003 | Potts et al. |
| 6,611,281 B2 | 8/2003 | Strubbe |
| 6,680,856 B2 | 1/2004 | Schreiber |
| 6,693,663 B1 | 2/2004 | Harris |
| 6,704,048 B1 | 3/2004 | Malkin et al. |
| 6,710,797 B1 | 3/2004 | McNelley et al. |
| 6,751,106 B2 | 6/2004 | Zhang et al. |
| 6,768,722 B1 | 7/2004 | Katseff et al. |
| 6,771,303 B2 | 8/2004 | Zhang et al. |
| 6,774,927 B1 | 8/2004 | Cohen et al. |
| 6,795,108 B2 | 9/2004 | Jarboe et al. |
| 6,795,558 B2 | 9/2004 | Matsuo et al. |
| 6,798,834 B1 | 9/2004 | Murakami et al. |
| 6,806,898 B1 | 10/2004 | Toyama et al. |
| 6,807,280 B1 | 10/2004 | Stroud et al. |
| 6,844,990 B2 | 1/2005 | Artonne et al. |
| 6,853,398 B2 | 2/2005 | Malzbender et al. |
| 6,867,798 B1 | 3/2005 | Wada et al. |
| 6,882,358 B1 | 4/2005 | Schuster et al. |
| 6,888,358 B2 | 5/2005 | Lechner et al. |
| 6,909,438 B1 | 6/2005 | White et al. |
| 6,911,995 B2 | 6/2005 | Ivanov et al. |
| 6,917,271 B2 | 7/2005 | Zhang et al. |
| 6,922,718 B2 | 7/2005 | Chang |
| 6,963,653 B1 | 11/2005 | Miles |
| 6,980,526 B2 | 12/2005 | Jang et al. |
| 6,989,754 B2 | 1/2006 | Kiscanin et al. |
| 6,989,836 B2 | 1/2006 | Ramsey |
| 6,989,856 B2 | 1/2006 | Firestone et al. |
| 6,990,086 B1 | 1/2006 | Holur et al. |
| 7,002,973 B2 | 2/2006 | MeLampy et al. |
| 7,028,092 B2 | 4/2006 | MeLampy et al. |
| 7,031,311 B2 | 4/2006 | MeLampy et al. |
| 7,043,528 B2 | 5/2006 | Schmitt et al. |
| 7,046,862 B2 | 5/2006 | Ishizaka et al. |
| 7,057,636 B1 | 6/2006 | Cohen-Solal et al. |
| 7,057,662 B2 | 6/2006 | Malzbender |
| 7,061,896 B2 | 6/2006 | Jabbari et al. |
| 7,080,157 B2 | 7/2006 | McCanne |
| 7,092,002 B2 | 8/2006 | Ferren et al. |
| 7,111,045 B2 | 9/2006 | Kato et al. |
| 7,131,135 B1 | 10/2006 | Virag et al. |
| 7,136,651 B2 | 11/2006 | Kalavade |
| 7,139,767 B1 | 11/2006 | Taylor et al. |
| D533,525 S | 12/2006 | Arie |
| D533,852 S | 12/2006 | Ma |
| D534,511 S | 1/2007 | Maeda et al. |
| D535,954 S | 1/2007 | Hwang et al. |
| 7,158,674 B2 | 1/2007 | Suh |
| 7,161,942 B2 | 1/2007 | Chen et al. |
| D539,243 S | 3/2007 | Chiu et al. |
| D541,773 S | 5/2007 | Chong et al. |
| D542,247 S | 5/2007 | Kinoshita et al. |
| D545,314 S | 6/2007 | Kim |
| 7,246,118 B2 | 7/2007 | Chastain et al. |
| D550,635 S | 9/2007 | DeMaio et al. |
| D551,184 S | 9/2007 | Kanou et al. |
| 7,269,292 B2 | 9/2007 | Steinberg |
| 7,274,555 B2 | 9/2007 | Kim et al. |
| D555,610 S | 11/2007 | Yang et al. |
| D561,130 S | 2/2008 | Won et al. |
| 7,336,299 B2 | 2/2008 | Kostrzewski |
| D567,202 S | 4/2008 | Rieu Piquet |
| 7,352,809 B2 | 4/2008 | Wenger et al. |
| 7,353,279 B2 | 4/2008 | Durvasula et al. |
| 7,359,731 B2 | 4/2008 | Choksi |
| 7,399,095 B2 | 7/2008 | Rondinelli |
| 7,411,975 B1 | 8/2008 | Mohaban |
| 7,413,150 B1 | 8/2008 | Hsu |
| 7,428,000 B2 | 9/2008 | Cutler et al. |
| D578,496 S | 10/2008 | Leonard |
| 7,440,615 B2 | 10/2008 | Gong et al. |
| 7,471,320 B2 | 12/2008 | Malkin et al. |
| 7,477,657 B1 | 1/2009 | Murphy et al. |
| D588,560 S | 3/2009 | Mellingen et al. |
| 7,518,051 B2 | 4/2009 | Redmann |
| D592,621 S | 5/2009 | Han |
| 7,532,230 B2 | 5/2009 | Culbertson et al. |
| 7,532,232 B2 | 5/2009 | Shah et al. |
| 7,545,761 B1 | 6/2009 | Kalbag |
| 7,551,432 B1 | 6/2009 | Bockheim et al. |
| 7,555,141 B2 | 6/2009 | Mori |
| D602,453 S | 10/2009 | Ding et al. |
| 7,616,226 B2 | 11/2009 | Roessler et al. |
| D610,560 S | 2/2010 | Chen |
| 7,679,639 B2 | 3/2010 | Harrell et al. |
| 7,692,680 B2 | 4/2010 | Graham |
| 7,707,247 B2 | 4/2010 | Dunn et al. |
| D615,514 S | 5/2010 | Mellingen et al. |
| 7,710,448 B2 | 5/2010 | De Beer et al. |
| 7,710,450 B2 | 5/2010 | Dhuey et al. |
| 7,715,657 B2 | 5/2010 | Lin et al. |
| 7,719,605 B2 | 5/2010 | Hirasawa et al. |
| 7,719,662 B2 | 5/2010 | Bamji et al. |
| 7,720,277 B2 | 5/2010 | Hattori |
| D626,102 S | 10/2010 | Buzzard et al. |

| | | |
|---|---|---|
| D626,103 S | 10/2010 | Buzzard et al. |
| D628,175 S | 11/2010 | Desai et al. |
| 7,839,434 B2 | 11/2010 | Ciudad et al. |
| D628,968 S | 12/2010 | Desai et al. |
| 7,889,851 B2 | 2/2011 | Shah et al. |
| 7,894,531 B1 | 2/2011 | Cetin et al. |
| D635,569 S | 4/2011 | Park |
| D635,975 S | 4/2011 | Seo et al. |
| 7,939,959 B2 | 5/2011 | Wagoner |
| 7,990,422 B2 | 8/2011 | Ahiska et al. |
| 8,000,559 B2 | 8/2011 | Kwon |
| 8,135,068 B1 | 3/2012 | Alvarez |
| 8,179,419 B2 | 5/2012 | Girish et al. |
| 2002/0047892 A1 | 4/2002 | Gonsalves |
| 2002/0106120 A1 | 8/2002 | Brandenburg et al. |
| 2002/0108125 A1 | 8/2002 | Joao |
| 2002/0118890 A1 | 8/2002 | Rondinelli |
| 2002/0131608 A1 | 9/2002 | Lobb et al. |
| 2002/0140804 A1 | 10/2002 | Colmenarez et al. |
| 2002/0149672 A1 | 10/2002 | Clapp et al. |
| 2002/0186528 A1 | 12/2002 | Huang |
| 2003/0017872 A1 | 1/2003 | Oishi et al. |
| 2003/0048218 A1 | 3/2003 | Milnes et al. |
| 2003/0072460 A1 | 4/2003 | Gonopolskiy et al. |
| 2003/0149724 A1 | 8/2003 | Chang |
| 2003/0160861 A1 | 8/2003 | Barlow et al. |
| 2003/0179285 A1 | 9/2003 | Naito |
| 2003/0185303 A1 | 10/2003 | Hall |
| 2004/0003411 A1 | 1/2004 | Nakai et al. |
| 2004/0032906 A1 | 2/2004 | Lillig |
| 2004/0038169 A1 | 2/2004 | Mandelkern et al. |
| 2004/0061787 A1* | 4/2004 | Liu et al. .................. 348/218.1 |
| 2004/0091232 A1 | 5/2004 | Appling, III |
| 2004/0118984 A1 | 6/2004 | Kim et al. |
| 2004/0119814 A1 | 6/2004 | Clisham et al. |
| 2004/0164858 A1 | 8/2004 | Lin |
| 2004/0165060 A1 | 8/2004 | McNelley et al. |
| 2004/0178955 A1 | 9/2004 | Menache et al. |
| 2004/0189463 A1 | 9/2004 | Wathen |
| 2004/0189676 A1 | 9/2004 | Dischert |
| 2004/0196250 A1 | 10/2004 | Mehrotra et al. |
| 2004/0207718 A1 | 10/2004 | Boyden et al. |
| 2004/0218755 A1 | 11/2004 | Marton et al. |
| 2004/0246962 A1 | 12/2004 | Kopeikin et al. |
| 2004/0254982 A1 | 12/2004 | Hoffman et al. |
| 2004/0260796 A1 | 12/2004 | Sundqvist et al. |
| 2005/0007954 A1 | 1/2005 | Sreemanthula et al. |
| 2005/0024484 A1 | 2/2005 | Leonard |
| 2005/0050246 A1 | 3/2005 | Lakkakorpi et al. |
| 2005/0081160 A1 | 4/2005 | Wee et al. |
| 2005/0110867 A1 | 5/2005 | Schulz |
| 2005/0117022 A1 | 6/2005 | Marchant |
| 2005/0129325 A1 | 6/2005 | Wu |
| 2005/0147257 A1 | 7/2005 | Melchior et al. |
| 2005/0248652 A1 | 11/2005 | Firestone et al. |
| 2005/0268823 A1 | 12/2005 | Bakker et al. |
| 2006/0013495 A1 | 1/2006 | Duan et al. |
| 2006/0017807 A1 | 1/2006 | Lee et al. |
| 2006/0028983 A1 | 2/2006 | Wright |
| 2006/0056056 A1 | 3/2006 | Ahiska et al. |
| 2006/0066717 A1 | 3/2006 | Miceli |
| 2006/0072813 A1 | 4/2006 | Matsumoto et al. |
| 2006/0082643 A1 | 4/2006 | Richards |
| 2006/0093128 A1 | 5/2006 | Oxford |
| 2006/0100004 A1 | 5/2006 | Kim et al. |
| 2006/0104470 A1 | 5/2006 | Akino |
| 2006/0120307 A1 | 6/2006 | Sahashi |
| 2006/0121568 A1 | 6/2006 | McConville et al. |
| 2006/0125691 A1 | 6/2006 | Menache et al. |
| 2006/0126878 A1 | 6/2006 | Takumai et al. |
| 2006/0152489 A1 | 7/2006 | Sweetser et al. |
| 2006/0152575 A1 | 7/2006 | Amiel et al. |
| 2006/0158509 A1 | 7/2006 | Kenoyer et al. |
| 2006/0168302 A1 | 7/2006 | Boskovic et al. |
| 2006/0170769 A1 | 8/2006 | Zhou |
| 2006/0181607 A1 | 8/2006 | McNelley et al. |
| 2006/0200518 A1 | 9/2006 | Sinclair et al. |
| 2006/0256187 A1 | 11/2006 | Sheldon et al. |
| 2006/0284786 A1 | 12/2006 | Takano et al. |
| 2007/0039030 A1 | 2/2007 | Romanowich et al. |
| 2007/0040903 A1 | 2/2007 | Kawaguchi |
| 2007/0070177 A1 | 3/2007 | Christensen |
| 2007/0080845 A1 | 4/2007 | Amand |
| 2007/0112966 A1 | 5/2007 | Eftis et al. |
| 2007/0120971 A1 | 5/2007 | Kennedy |
| 2007/0121353 A1 | 5/2007 | Zhang et al. |
| 2007/0140337 A1 | 6/2007 | Lim et al. |
| 2007/0153712 A1 | 7/2007 | Fry et al. |
| 2007/0159523 A1 | 7/2007 | Hillis et al. |
| 2007/0183661 A1 | 8/2007 | El-Maleh et al. |
| 2007/0188597 A1 | 8/2007 | Kenoyer et al. |
| 2007/0192381 A1 | 8/2007 | Padmanabhan |
| 2007/0206091 A1 | 9/2007 | Dunn et al. |
| 2007/0206556 A1 | 9/2007 | Yegani et al. |
| 2007/0217406 A1 | 9/2007 | Riedel et al. |
| 2007/0217500 A1 | 9/2007 | Gao et al. |
| 2007/0229250 A1 | 10/2007 | Recker et al. |
| 2007/0247470 A1 | 10/2007 | Dhuey et al. |
| 2007/0250567 A1 | 10/2007 | Graham et al. |
| 2007/0250620 A1 | 10/2007 | Shah et al. |
| 2007/0263079 A1 | 11/2007 | Graham et al. |
| 2007/0279483 A1 | 12/2007 | Beers et al. |
| 2007/0279484 A1 | 12/2007 | Derocher et al. |
| 2008/0077390 A1 | 3/2008 | Nagao |
| 2008/0136896 A1 | 6/2008 | Graham et al. |
| 2008/0151038 A1 | 6/2008 | Khouri et al. |
| 2008/0167078 A1 | 7/2008 | Elbye |
| 2008/0208444 A1 | 8/2008 | Ruckart |
| 2008/0212677 A1 | 9/2008 | Chen et al. |
| 2008/0218582 A1 | 9/2008 | Buckler |
| 2008/0232692 A1 | 9/2008 | Kaku |
| 2008/0240237 A1 | 10/2008 | Tian et al. |
| 2008/0240571 A1 | 10/2008 | Tian et al. |
| 2008/0246833 A1 | 10/2008 | Yasui et al. |
| 2008/0266380 A1 | 10/2008 | Gorzynski et al. |
| 2008/0297586 A1 | 12/2008 | Kurtz et al. |
| 2008/0298571 A1 | 12/2008 | Kurtz et al. |
| 2008/0303901 A1 | 12/2008 | Variyath et al. |
| 2009/0009593 A1 | 1/2009 | Cameron et al. |
| 2009/0051756 A1 | 2/2009 | Trachtenberg |
| 2009/0122867 A1 | 5/2009 | Mauchly et al. |
| 2009/0174764 A1 | 7/2009 | Chadha et al. |
| 2009/0207233 A1 | 8/2009 | Mauchly et al. |
| 2009/0207234 A1 | 8/2009 | Chen et al. |
| 2009/0256901 A1 | 10/2009 | Mauchly et al. |
| 2009/0279476 A1 | 11/2009 | Li et al. |
| 2009/0322082 A1 | 12/2009 | Wagoner |
| 2009/0324023 A1 | 12/2009 | Tian et al. |
| 2010/0118112 A1 | 5/2010 | Nimri et al. |
| 2010/0123770 A1 | 5/2010 | Friel et al. |
| 2010/0171807 A1 | 7/2010 | Tysso |
| 2010/0171808 A1 | 7/2010 | Harrell et al. |
| 2010/0183199 A1 | 7/2010 | Smith et al. |
| 2010/0199228 A1 | 8/2010 | Latta et al. |
| 2010/0208078 A1 | 8/2010 | Tian et al. |
| 2010/0225732 A1 | 9/2010 | De Beer et al. |
| 2010/0259619 A1 | 10/2010 | Nicholson |
| 2010/0277563 A1 | 11/2010 | Gupta et al. |
| 2010/0316232 A1 | 12/2010 | Acero et al. |
| 2011/0063467 A1 | 3/2011 | Tanaka |
| 2011/0085016 A1 | 4/2011 | Kristiansen et al. |
| 2012/0038742 A1 | 2/2012 | Robinson et al. |

FOREIGN PATENT DOCUMENTS

| | | |
|---|---|---|
| CN | 102067593 | 5/2011 |
| EP | 0 650 299 | 10/1994 |
| EP | 0 714 081 | 11/1995 |
| EP | 0 740 177 | 4/1996 |
| EP | 143745 A2 | 10/2001 |
| EP | 1 178 352 A1 | 6/2002 |
| EP | 1 589 758 A1 | 10/2005 |
| EP | 1701308 A2 | 9/2006 |
| EP | 1768058 A2 | 3/2007 |
| EP | 2073543 A1 | 6/2009 |
| EP | 2255531 | 12/2010 |
| EP | 22777308 | 1/2011 |
| GB | 2 294 605 A | 5/1996 |
| GB | 2336266 | 10/1999 |

| | | |
|---|---|---|
| GB | 2355876 A | 5/2001 |
| WO | WO 94/16517 | 7/1994 |
| WO | WO 96/21321 | 7/1996 |
| WO | WO 97/8896 | 3/1997 |
| WO | WO 98/47291 | 10/1998 |
| WO | WO 99/59026 | 11/1999 |
| WO | WO 01/33840 | 5/2001 |
| WO | WO 2005/013001 A2 | 2/2005 |
| WO | WO 2005/031001 A3 | 2/2005 |
| WO | WO 2006/072755 | 7/2006 |
| WO | WO2007/106157 | 9/2007 |
| WO | WO2007/123946 | 11/2007 |
| WO | WO 2007/123960 A2 | 11/2007 |
| WO | WO 2007/123960 A3 | 11/2007 |
| WO | WO 2008/039371 | 4/2008 |
| WO | WO 2008/040258 | 4/2008 |
| WO | WO 2008/101117 A1 | 8/2008 |
| WO | WO 2008/118887 A2 | 10/2008 |
| WO | WO 2008/118887 A3 | 10/2008 |
| WO | WO 2009/102503 A2 | 8/2009 |
| WO | WO 2009/120814 A2 | 10/2009 |
| WO | WO 2009/120814 A3 | 10/2009 |
| WO | WO 2010/059481 | 5/2010 |
| WO | WO2010/096342 | 8/2010 |
| WO | WO 2010/104765 | 9/2010 |
| WO | WO 2010/132271 | 11/2010 |
| WO | WO2012/033716 | 3/2012 |

OTHER PUBLICATIONS

U.S. Appl. No. 12/877,833, filed Sep. 8, 2010, entitled "System and Method for Skip Coding During Video Conferencing in a Network Environment," Inventor[s]: Dihong Tian, et al.

U.S. Appl. No. 12/870,687, filed Aug. 27, 2010, entitled "System and Method for Producing a Performance Via Video Conferencing in a Network Environment," Inventor(s): Michael A. Arnao et al.

U.S. Appl. No. 12/912,556, filed Oct. 26, 2010, entitled "System and Method for Provisioning Flows in a Mobile Network Environment," Inventors: Balaji Vankat Vankataswami, et al.

U.S. Appl. No. 12/949,614, filed Nov. 18, 2010, entitled "System and Method for Managing Optics in a Video Environment," Inventors; Torence Lu, et al.

U.S. Appl. No. 12/873,100, filed Aug. 31, 2010, entitled "System and Method for Providing Depth Adaptive Video Conferencing," Inventor(s): J. William Mauchly et al.

U.S. Appl. No. 12/946,679, filed Nov. 15, 2010, entitled "System and Method for Providing Camera Functions in a Video Environment," Inventors; Peter A.J. Forneli, et al.

U.S. Appl. No. 12/946,695, filed Nov. 15, 2010, entitled "System and Method for Providing Enhanced Audio in a Video Environment," Inventors: Wei Li, et al.

U.S. Appl. No. 12/907,914, filed Oct. 19, 2010, entitled "System and Method for Providing Videomail in a Network Environment," Inventors: David J. Mackie et al.

U.S. Appl. No. 12/950,786 filed Nov. 19, 2010, entitled "System and Method for Providing Enhanced Video Processing in a Network Environment," Inventor[s]: David J. Mackie.

U.S. Appl. No. 12/907,919, filed Oct. 19, 2010, entitled "System and Method for Providing Connectivity in a Network Environment," Inventors: David J. Mackie et al.

U.S. Appl. No. 12/946,704, filed Nov. 15, 2010, entitled "System and Method for Providing Enhanced Graphics in a Video Environment," Inventors: John M. Kanalakis, Jr., et al.

U.S. Appl. No. 12/957,116, filed Nov. 30, 2010, entitled "System and Method for Gesture Interface Control," Inventors: Shuan K. Kirby, et al.

U.S. Appl. No. 12/907,925, filed Oct. 19, 2010, entitled "System and Method for Providing a Pairing Mechanism in a Video Environment," Inventors: Gangfeng Kong et al.

U.S. Appl. No. 12/939,037, filed Nov. 3, 2010, entitled "System and Method for Managing Flows in a Mobile Network Environment," Inventors: Balaji Venkat Venkataswami et al.

U.S. Appl. No. 12/946,709, filed Nov. 15, 2010, entitled "System and Method for Providing Enhanced Graphics in a Video Environment," Inventors: John M. Kanalakis, Jr., et al.

U.S. Design U.S. Appl. No. 29/375,624, filed Sep. 24, 2010, entitled "Mounted Video Unit," Inventor(s): Ashok T. Desai et al.

U.S. Design U.S. Appl. No. 29/375,627, filed Sep. 24, 2010, entitled "Mounted Video Unit," Inventor(s): Ashok T. Desai et al.

U.S. Design U.S. Appl. No. 29/369,951, filed Sep. 15, 2010, entitled "Video Unit With Integrated Features," Inventor(s): Kyle A. Buzzard et al.

U.S. Design U.S. Appl. No. 29/375,458, filed Sep. 22, 2010, entitled "Video Unit With Integrated Features," Inventor(s): Kyle A. Buzzard et al.

U.S. Design U.S. Appl. No. 29/375,619, filed Sep. 24, 2010, entitled "Free-Standing Video Unit," Invento(s): Ashok T. Desai et al.

U.S. Design U.S. Appl. No. 29/381,245, filed Dec. 16, 2010, entitled "Interface Element," Inventor(s): John M. Kanalakis, Jr., et al.

U.S. Design U.S. Appl. No. 29/381,250, filed Dec. 16, 2010, entitled "Interface Element," Inventor(s): John M. Kanalakis, Jr., et al.

U.S. Design U.S. Appl. No. 29/381,254, filed Dec. 16, 2010, entitled "Interface Element," Inventor(s): John M. Kanalakis, Jr., et al.

U.S. Design U.S. Appl. No. 29/381,256, filed Dec. 16, 2010, entitled "Interface Element," Inventor(s): John M. Kanalakis, Jr., et al.

U.S. Design U.S. Appl. No. 29/381,259, filed Dec. 16, 2010, entitled "Interface Element," Inventor(s): John M. Kanalakis, Jr., et al.

U.S. Design U.S. Appl.No. 29/381,260, filed Dec. 16, 2010, entitled "Interface Element," Inventor(s): John M. Kanalakis, Jr., et al.

U.S. Design U.S. Appl. No. 29/381,262, filed Dec. 16, 2010, entitled "Interface Element," Inventor(s): John M. Kanalakis, Jr., et al.

U.S. Design U.S. Appl. No. 29/381,264, filed Dec. 16, 2010, entitled "Interface Element," Inventor(s): John M. Kanalakis, Jr., et al.

3G, "World's First 3G Video Conference Service with New TV Commercial," Apr. 28, 2005, 4 pages; http://www.3g.co.uk/PR/April2005/1383.htm.

Andersson, L., et al., ""LDP Specification,"" Network Working Group, RFC 3036, Jan. 2001, 133 pages; http://tools.ietf.org/html/rfc3036.

Awduche, D., et al., "Requirements for Traffic Engineering over MPLS," Network Working Group, RFC 2702, Sep. 1999, 30 pages; http://tools.ietf.org/pdf/rfc2702.pdf.

Berzin, O., et al., "Mobility Support Using MPLS and MP-BGP Signaling," Network Working Group, Apr. 28, 2008, 60 pages; http://www.potaroo.net/ietf/all-ids/draft-berzin-malis-mpls-mobility-01.txt.

Chen, Qing, et al., "Real-time Vision-based Hand Gesture Recognition Using Haar-like Features," Instrumentation and Measurement Technology Conference, Warsaw, Poland, May 1-3, 2007, 6 pages; http://www.google.com/url?sa=t&source=web&cd=1&ved=0CB4QFjAA&url=http%3A%2F%2Fciteseerx.ist.psu.edu%2Fviewdoc%2Fdownload%3Fdoi%3D10.1.1.93.103%26rep%3Drep1%26type%3Dpdf&ei=A28RTLKRDeftnQeXzZGRAw&usg=AFQjCNHpwj5MwjgGp-3goVzSWad6CO-Jzw.

"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.

Digital Video Enterprises, "DVE Eye Contact Silhouette," 1 page, © DVE 2008; http://www.dvetelepresence.com/products/eyeContactSilhouette.asp.

Gluckman, Joshua, et al., "Rectified Catadioptric Stereo Sensors," 8 pages, retrieved and printed on May 17, 2010; http://cis.poiy.edu/~gluckman/papers/cvprOO.pdf.

Gundavelli, S., et al., "Proxy Mobile IPv6," Network Working Group, RFC 5213, Aug. 2008, 93 pages; http://tools.ietf.org/pdf/rfc5213.pdf.

Hepper, D., "Efficiency Analysis and Application of Uncovered Background Prediction in a Low BitRate Image Coder," IEEE Transactions on Communications, vol. 38, No. 9, pp. 1578-1584, Sep. 1990.

Jamoussi, Bamil, "Constraint-Based LSP Setup Using LDP," MPLS Working Group, Sep. 1999, 34 pages; http://tools.ietf.org/html/draft-ietf-mpls-cr-ldp-03.

Jeyatharan, M., et al., "3GPP TFT Reference for Flow Binding," MEXT Working Group, Mar. 2, 2010, 11 pages; http:/www.ietf.org/id/draft-jeyatharan-mext-flow-tftemp-reference-00.txt.

Kollarits, R.V., et al., "34.3: An Eye Contact Camera/Display System for Videophone Applications Using a Conventional Direct-View LCD," © 1995 SID, ISSN0097-0966X/95/2601, pp. 765-768; http://citeseerx.ist.psu.edu/viewdoc/download;jsessionid=47A1E7E028C26503975E633895D114EC?doi=10.1.1.42.1772&rep=rep1&type=pdf.

Kelsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages; http://fulfillment.umi.com/dissertations/b7afbcb56ba72fdb14d26dfccc6b470f/1291487062/3143800.pdf.

Marvin imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNlcrl.

Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.

Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1.29.8621&type=ab.

PCT Notification of Transmittal of the International Search Report and the Written Opinion of the International Searching Authority, or the Declaration; PCT/US2009/038310; dated Oct. 10, 2009; 19 pages.

PCT international Preliminary Report on Patentability mailed Aug. 26, 2010 for PCT/US2009/001070; 10 pages.

PCT International Preliminary Report on Patentability mailed Oct. 7, 2010 for PCT/US2009/038310; 10 pages.

PCT International Report of Patentability dated May 15, 2006, for PCT International Application PCT/US2004/021585, 6 pages.

PCT International Search Report mailed Aug. 24, 2010 for PCT/US2010033880; 4 pages.

PCT Notification of Transmittal of the International Search Report and the Written Opinion of the International Searching Authority, or the Declaration; PCT/US2010/26456; dated Jun. 29, 2010; 11 pages.

"Real-time Hand Motion/Gesture Detection HCI-Demo 2," video clip, YouTube, posted Dec. 17, 2008 by smmy0705, 1 page; www.youtube.com/watch?v=mLT4CFLIi8A&feature=related.

"Simple Hand Gesture Recognition," video clip, YouTube, posted Aug. 25, 2008 by pooh8210, 1 page; http://www.youtube.com/watch?v=F8GVeV0dYLM&feature=related.

Soliman, H., et ai., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.

Sudan, Ranjeet, "Signaling in MPLS Networks with RSVP-TE-Technology information," Telecommunications, Nov. 2000, 3 pages; http://findarticies.com/p/articles/mi_mOTLC/is_11_34/ai_67447072/.

Trevor Darrell, "A Real-Time Virtual Mirror Display," 1 page, Sep. 9, 1998; http://people.csail.mit.edu/trevor/papers/1998-021./node6.html.

Wachs, J., et al., "A Real-time Hand Gesture System Based on Evolutionary Search," Vision, 3rd Quarter 2006, vol. 22, No. 3, 18 pages; http://web.ics.purdue.edu/~jpwachs/papers/3q06vi.pdf.

Wang, Robert and Jovan Popovic, "Bimanual rotation and scaling," video clip, YouTube, posted by rkeltset on Apr. 14, 2010, 1 page; http:///www.youtube.com/watch?v=7TPFSCX79U.

Wang, Robert and Jovan Popovic, "Desktop virtual reality," video clip, YouTube, posted by rkeltset on Apr. 8, 2010, 1 page; http://www.youtube.com/watch?v=9rBtm62Lkfk.

Wang, Robert and Jovan Popovic, "Gesture user input," video clip, YouTube, posted by rkeltset on May 19, 2010, 1 page; http://www.youtube.com/watch?v=3JWYTtBjdTE.

Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.

Wang, Robert and Jovan Popovic, "Real-Time Hand-Tracking with a Color Glove, ACM Transaction on Graphics," 4 pages, [Retrieved and printed on Dec. 1, 2010] http://people.csail.mit.edu/rywang/hand.

Wang, Robert and Jovan Popovic, "Real-Time Hand-Tracking with a Color Glove, ACM Transaction on Graphics" (SIGGRAPH 2009), 28(3), Aug. 2009; 8 pages http://people.csail.mit.edu/rywang/handtracking/s09-hand-tracking.pdf.

Wang, Robert and Jovan Popovic, "Tracking the 3D pose and configuration of the hand," video clip, YouTube, posted by rkeltset on Mar. 31, 2010, 1 page; http://www.youtube.com/watch?v=JOXwjkWP6Sw.

"Wi-Fi Protected Setup," from Wikipedia, Sep. 2, 2010, 3 pages http://en.wikipedia.org/wiki/Wi-Fi_Protected_Setup.

Xia, F., et al., "Home Agent Initiated Flow Binding for Mobile IPv6," Network Working Group, Oct. 19, 2009, 15 pages; http://tools.ietf.orghtml/draft-xia-mext-ha-init-flow-binding-01.txt.

Yegani, P. et al., "GRE Key Extension for Mobile IPv4," Network Working Group, Feb. 2006, 11 pages; http://tools.ietf.org/pdf/draft-yegani-gre-key-extension-01.pdf.

Zhong, Ren, et al., "Integration of Mobile IP and MPLS," Network Working Group, Jul. 2000, 15 pages; http://tools.ietf.org/html/draft-zhong-mobile-ip-mpls-01.

"Oblong Industries is the developer of the g-speak spatial operation environment," Oblong Industries Information Page, 2 pages, [Retrieved and printed on Dec. 1, 2010] http://oblong.com.

Underkoffler, John, "G-Speak Overview 1828121108," video clip, Vimeo.com, 1 page, [Retrieved and printed on Dec. 1, 2010] http://vimeo.com/2229299.

Kramer, Kwindla, "Mary Ann de Lares Norris at Thinking Digital," Oblong Industries, Inc. Web Log, Aug. 24, 2010; 1 page; http://oblong.com/articies/0BS6hEeJmoHoCwgJ.html.

"Mary Ann de Lares Norris," video clip, Thinking Digital 2010 Day Two, Thinking Digital Videos, May 27, 2010, 3 pages; http://videos.thinkingdigital.co.uk/2010/05/mary-ann-de-lares-norris-oblong/.

Kramer, Kwindla, "Oblong at TED," Oblong Industries, Inc. Web Log, Jun. 6, 2010, 1 page; http://oblong.com/article/0B22LFIS1NVyrOmR.html.

Video on TED.com, Pranav Mistry: the Thrilling Potential of SixthSense Technology (5 pages) and Interactive Transcript (5 pages), retrieved and printed on Nov. 30, 2010; http://www.ted.com/talks/pranav_mistry_the_thrilling_potential_of_sixthsense_technology.html.

"John Underkoffler points to the future of UI," video clip and interactive transcript, Video on TED.com, Jun. 2010, 6 pages; http://www.ted.com/talks/john_underkoffler_drive_3d_data_with_a_gesture.html.

Kramer, Kwindla, "Oblong on Bloomberg TV," Oblong Industries, Inc. Web Log, Jan. 28, 2010, 1 page; http://oblong.com/article/0AN_1KD9q990PEnw.html.

Kramer, Kwindla, "g-speak at RISD, Fall 2009," Oblong Industries, Inc. Web Log, Oct. 29, 2009, 1 page; http://oblong.com/article/09uW060q6xRIZYvm.html.

Kramer, Kwindla, "g-speak + TMG," Oblong Industries, Inc. Web Log, Mar. 24, 2009, 1 page; http://oblong.com/article/08mM77zpMm7kFtv.html.

"g-stalt version 1," video clip, YouTube.com, posted by zigg1es on Mar. 15, 2009, 1 page; http://youtube.com/watch?v=k8ZAql4mdvk.

Underkoffler, John, "Carlton Sparrell speaks at MIT," Oblong Industries, Inc. Web Log, Oct. 30, 2009, 1 page, http://oblong.com/article/09usAB4I1Ukb6CPw.html.

Underkoffler, John, "Carlton Sparrell at MIT Media Lab," video clip, Vimeo.com, 1 page [Retrieved and printed Dec. 1, 2010] http://vimeo.com/7355992.

Underkoffler, John, "Oblong at Altitude: Sundance 2009," Oblong Industries, Inc. Web Log, Jan. 20, 2009, 1 page; http://oblong.com/article/08Sr62ron_2akg0D.html.

Underkoffler, John, "Oblong's tamper system 1801011309," video clip, Vimeo.com, 1 page, [Retrieved and printed Dec. 1, 2010] http://vimeo.com/2821182.

Feld, Brad, "Science Fact," Oblong Industries, Inc. Web Log, Nov. 13, 2008, 2 pages, http://oblong.com/article/084H-PKI5Tb9I4Ti.html.

Kwindla Kramer, "g-speak in slices," Oblong Industries, Inc. Web Log, Nov. 13, 2008, 6 pages; http://oblong.com/article/0866JqfNrFg1NeuK.html Underkoffler, John, "Origins: arriving here," Oblong Industries, Inc. Web Log, Nov. 13, 2008, 5 pages; http://oblong.com/article/085zBpRSY9JeLv2z.html.

Rishel, Christian, "Commercial overview: Platform and products," Oblong Industries, Inc., Nov. 13, 2008, 3 pages; http://oblong.com/article/086E19gPvDcktAf9.html.

Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.

PCT Oct. 12, 2011 International Search Report and Written Opinion of the ISA from PCT/US2011/050380.

PCT Nov. 24, 2011 International Preliminary Report on Patentability from International Application Serial No. PCT/US2010/033880; 6 pages.

PCT Sep. 13, 2011 International Preliminary Report on Patentability and the Written Opinion of the ISA from PCT/US2010/026456; 5 pages.

PCT Jan. 23, 2012 International Search Report and Written Opinion of the ISA from International Application Serial No. PCT/US2011/060579; 10 pages.

PCT Jan. 23, 2012 International Search Report and Written Opinion of the ISA from International Application Serial No. PCT/US2011/060584; 11 pages.

PCT Feb. 20, 2012 International Search Report and Written Opinion of the ISA from International Application Serial No. PCT/US2011/061442; 12 pages.

U.S. Appl. No. 13/036,925, filed Feb. 28, 2011, entitled "System and Method for Selection of Video Data in a Video Conference Environment," Inventor(s) Sylvia Olayinka Aya Manfa N'guessan.

Richardson, Iain, et a>, "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.

Gussenhoven, Caros, "Chapter 5 Transcription of Dutch Intonation." Nov. 9, 2003, 33 pages; http://www.ru.nl/publish/pages/516003/todisun-ah.pdf.

Hock, Hans Henrich, "Prosody vs. Syntax: Prosodic rebracketing of final vocatives in English," 4 pages; [retrieved and printed on Mar. 3, 2011] http://speechprosody2010.Illinois.edu/papers/100931.pdf.

"Vocative Case," from Wikipedia, [retrieved and printed on Mar. 3, 2011] 11 pages; http://en.wikipedia.org/wiki/Vocative_case.

EPO Communication dated Feb. 25, 2011 for EPO9725288.6 (published as EP22777308); 4 pages.

U.S. Appl. No. 12/234,291, filed Sep. 19, 2008, entitled "System and Method for Enabling Communication Sessions in a Network Environment," Inventor(s): Yifan Gao et al.

U.S. Appl. No. 12/366,593, filed Feb. 5, 2009, entitled "System and Method for Depth Perspective Image Rendering," Inventor(s): J. William Mauchly et al.

U.S. Appl. No. 12/475,075, filed May 29, 2009, entitled "System and Method for Extending Communications Between Participants in a Conferencing Environment," Inventor(s): Brian J. Baldino et al.

U.S. Appl. No. 12/400,540, filed Mar. 9, 2009, entitled "System and Method for Providing Three Dimensional Video Conferencing in a Network Environment," Inventor(s): Karthik Dakshinamoorthy et al.

U.S. Appl. No. 12/400,582, filed Mar. 9, 2009, entitled "System and Method for Providing Three Dimensional Imaging in a Network Environment," Inventor(s): Shmuel Shaffer et al.

U.S. Appl. No. 12/539,461, filed Aug. 11, 2009, entitled "System and Method for Verifying Parameters in an Audiovisual Environment," Inventor: James M. Alexander.

U.S. Appl. No. 12/463,505, filed May 11, 2009, entitled "System and Method for Translating Communications Between Participants in a Conferencing Environment," Inventor(s): Marthinus F. De Beer et al.

U.S. Appl. No. 12/727,089, filed Mar. 18, 2010, entitled "System and Method for Enhancing Video Images in a Conferencing Environment," Inventor: Joseph T. Friel.

U.S. Appl. No. 12/784,257, filed May 20, 2010, entitled "Implementing Selective Image Enhancement," Inventors; Dihong Tian et al.

"3D Particles Experiments in AS3 and Flash CS3," printed Mar. 18, 2010, 2 pages; . http://www.flashandmath.com/advanced/fourparticles/notes.html.

active8-3D—Holographic Projection—3D Hologram Retail Display & Video Project, [retrieved Feb. 24, 2009], http://www.activ8-3d.co.uk/3d_holocubes, 1 page.

Avrilhis, Y., et al., "Color-Based Retrieval of Facial Images," European Signal Processing Conference (EUSIPCO '00), Tampere, Finland; Sep. 2000; 18 pages.

Boccaccio, Jeff; CEPro, "Inside HDMI CEC: The little-Known Control Feature," http://www.cepro.com/articie/print/inside_hdmi_cec_the_little_known_control_feature; Dec. 28, 2007, 2 pages.

Bücken R: "Bildfernsprechen: Videokonferenz vom Arbeitsplatz aus" Funkschau, Weka Fachzeitschrieten Verlag, Poing, DE, No. 17, Aug. 14, 1986, pp. 41-43, XP002537729; ISSN; 0016-2841, p. 43, left-hand column, line 34-middle column, line 24; 3pgs.

Chen, Jason, "iBiuetooth Lets iPhone Users Send and Receive Files Over Bluetooth," Mar. 13, 2009; 1 page; http://i.gizmodo.com/5169545/ibluetooth-lets-iphone-users-send-and-receive-flies-over-bluetooth.

Costa, Cristina, et at., "Quality Evaluation and Nonuniform Compression of Geometrically Distorted Images Using the Quadfree Distorsion Map," EURASIP Journal on Applied Signal Processing, vol. 2004, No. 12; pp. 1899-1911; ©2004 Hindawi Pubiishing Corp.; XP002536356; ISSN: 1110-8657; 16 pages.

Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved Feb. 26, 2009], http://research.microsoft.com/pubs/67266/criminis_techrep2003-59.pdf, 41 pages.

Daly, S., et al., "Face-based visually-optimized image sequence coding," Image Processing, 1998. ICIP 98. Proceedings; 1998 International Conference on Chicago, IL; Oct. 4-7: 1998, Los Alamitos; IEEE Computing; vol. 3, Oct. 4, 1998; pp. 443-447, ISBN: 978-0-8186-8821-8; XP010586786, 5 pages.

Diaz, Jesus iPhone Bluetooth File Transfer Coming Soon (YES!); Jan. 25, 2009; 1 page; http://i.gizmodo.com/5138797/iphone-bluetooth-file-transfer-coming-soon-yes.

Diaz, Jesus, "Zcam 3D Camera is Like Wii Without Wiimote and Minority Report Without Gloves," Dec. 15, 2007, 3 pgs.; http://gizmodo.com/gadgets/zcam-depth-camera-could-be-wii-challenger/zcam-3d-camera-is-like-wii-without-wiimote-and-minority-report-without-gloves-334426.php.

DVE Digital Video Enterprises, "DVE Tele-Immersion Room," http://www.dvetelepresence.com/products/Immersion_room.asp; 2009, 2 pgs.

"Dynamic Displays," copyright 2005-2008 [retrieved Feb. 24, 2009], http://www.zebraimaging.com/html/lighting_display.html, 2 pages.

ECmag.com, "IBS Products," Published Apr. 2009, 2 pages; http://www.ecmag.com/index.cfm?fa=article&articleID=10065.

Electrophysics Glossary, "Infrared Cameras. Thermal Imaging, Night Vision, Roof Moisture Detection," printed Mar. 18, 2010, 11 pages; http://www.electrophysics.com/Browse/Brw_Glossary.asp.

Farrukh, A., et al., Automated Segmentation of Skin-Tone Regions in Video Sequences, Proceedings IEEE Students Conference, ISCON_apos_02; Aug. 16-17, 2002; pp. 122-128; 7pgs.

Fiala, Mark, "Automatic Projector Calibration Using Self-Identifying Patterns," National Research Council of Canada, 2005; http://www.procams.org/procams2005/papers/procams05-36.pdf; 6 pages.

Freeman, Professor Wilson T., Computer Computer Vision Lecture Slides, "6.869 Advances in Computer Vision: Learning and Interfaces," Spring 2005; 21 pages.

Gemmell, Jim, et al., "Gaze Awareness for Video-conferencing: A Software Approach," IEEE MultiMedia, Oct.-Dec. 2000; 10 pages.

Gotchev, Atanas, "Computer Technologies for 3D video Delivery for Home Entertainment," International Conference on Computer Systems and Technologies; CompSysTech '08; 6 pgs; http://ecet.ecs.ru.acad.bg/csi08/docs/cp/Plenary/P.1.pdf.

Gries, Dan, "3D Particles Experiments in AS3 and Flash CS3, Dan's Comments," printed May 24, 2010 htto://www.flashandmath.com/advanced/fourparticies/notes.html; 3pgs.

Guernsey, Lisa, "Toward Better Communication Across the Language Barrier," Jul. 29, 1999, htip://www.nytimes.com/1999/07/29/technology/toward-better-communication-across-the-languape-barrier.html; 2 pages.

Habili Nariman et al. "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN 1051-8215; pp. 1086-1097; XP011115755; 13 pages.

Holographic Imaging, "Dynamic Holography for scientific uses, milliary heads up display and even someday HoloTV Using TI's DMD," [retrieved Feb. 26, 2009], http://innovation.swmed.edu/ research/instrumentation/res_inst_dev3d.html, 5 pages.

Hornbeck, Larry J., "Digital Light Processing™: A New MEMS-Based Display Technology," [retrieved Feb. 26, 2009]; http://focus.ti.com/pdfs/dipdmd/17_Digital_Light_Processing_MEMS_display_technology.pdf, 22 pages.

"Infrared Cameras TVS-200-EX," printed May 24, 2010; 3 pgs.; http://www.electrophysics.com/Browse/Brw_ProductLineCategory.asp?CategoryID=184&Area=IS.

IR Distribution Category@ Envious Technology, "IR Distribution Category," 2 pages http://www.envioustechnology.com.au/ products/product-list.php?CID=305. printed on Apr. 22, 2009.

IR Trans—Products and Orders—Ethernet Devices, 2 pages http;//www.irtrans.de/en/shop/tan.php, printed on Apr. 22, 2009.

Itoh, Hiroyasu, et al., "Use of a gain modulating framing camera for time-resolved imaging of cellular phenomena," SPIE vol. 2979, 1997, pp. 733-740; 8 pages.

Kazutake, Uehira, "Simulation of 3D image depth perception in a 3D display using two stereoscopic displays at different depths," http://adsabs.harvard.edu/abs/2006SPIE.6055.408U; 2006, 2 pgs.

Keijser, Jeroen, et al., "Exploring 3D interaction in Alternate Control-Display Space Mappings," IEEE Symposium on 3D User interfaces, Mar. 10-11, 2007, pp. 17-24; 8 pages.

Klint, Josh, "Deferred Rendering in Leadwerks Engine," Copyright Leadwersk Corporation 2008, 10 pages; http://www.leadwerks.com/files/Deferred_Rendering_in_Leadwerk_Engine.pdf.

Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; 6 pages http://ieeexplore.ieee.org/stamp.stamp.jsp?tp=&arnumber=4455782&isnumber=4455723.

Lawson, S., "Cisco Plans TelePresence Translation Next Year," Dec. 9, 2008; http://www.pcworld.com/ article/155237/.html?tk=rss_news; 2 pages.

Miller, Gregor, et al., "Interactive Free-Viewpoint Video," Centre for Vision, Speech and Signal Processing, [retrieved Feb. 26, 2009]; http://www.ee.surrey.ac.uk/./CVSSP/VMRG/ Publications/miller05cvmp.pdf, 10 pages.

"Minoru from Novo is the worlds first consumer 3D Webcam," Dec. 11, 2008 [retrieved Feb. 24, 2009], http://www.minoru3d.com, 4 pages.

Mitsubishi Electric Research Laboratories, copyright 2009, [Retrieved Feb. 26, 2009], http://www.merl.com/projects/3dtv, 2 pages.

National Training Systems Association Home—Main, Interservice/industry Training, Simulation & Education Conference, Dec. 1-4, 2008 [retrieved Feb. 26, 2009], http://ntsa.metapress.com/app/home/main.asp?referrer=default, 1 page.

OptoIQ, "Anti-Speckle Techniques Uses Dynamic Optics," Jun. 1, 2009, 2 pages; http://www.optoiq.com/index/photonics-technologies-applications/Ifw-display/Ifw-article-display/363444/articles/optoiq2/photonics-technologies/technology-products/optical-components/optical-mems/2009/12/anti-speckle-technique-uses-dynamic-optics/QP129867/cmpid=EnIOptoLFWJanuary132010.html.

OptoIQ, "Smart Camera Supports Multiple Interfaces," Jan. 22, 2009, 2 pages; http://www.optoiq.com/index/machine-vision-imaging-processing/display/vsd-article-display/350639/articles/vision-systems-design/daily-product-2/2009/01/smart-camera-supports-multiple-interfaces.html.

OptoIQ, "Vision Systems Design—Machine Vision and Image Processing Technology," printed Mar. 18, 2010, 2 pages; http://www.optoiq.com/index/machine-vision-imaging-processing.html.

PCT "Notification of the Transmittal of the International Search Report and the Written Opinion of the International Searching Authority, or the Declaration," PCT/US2009/001070, dated Apr. 8, 2009, 17 pages.

Radhika, N., et al., "Mobile Dynamic reconfigurable Context aware middleware for Adhoc smart spaces," vol. 22, 2008, 3 pages http://www.acadjournal.com/2008/V22/part6/p7.

"Rayvel Business-to-Business Products," copyright 2004 [retrieved Feb. 24, 2009], http://www.rayvel.com/b2b.html, 2 pages.

"Robust Face Localisation Using Motion, Colour & Fusion" Dec. 10, 2003; Proc. Vilth Digital Image Computing: Techniques and Applications, Sun C. et al (Eds.), Sydney; 10 pgs.; Retrieved from the Internet: http://www.cmis.csiro.au/Hugues.Talbot/dicta2003/cdrom/pdf/0899.pdf; pp. 899-908, XP007905630.

School of Computing, "Bluetooth over IP for Mobile Phones," 1 page http://www.computing.dcu.ie/wwwadmin/fyp-abstract/list/fyp_details05.jsp?year=2005&number=51470574.

Sena, "Industrial Bluetooth," 1 page http://www.sena.com/products/industrial_blustooth, printed on Apr. 22, 2009.

Shaffer, Shmuel, "Translation—State of the Art" presentation; Jan. 15, 2009; 22 pages.

Shi, C. et al., "Automatic image Quality Improvement for Videoconferencing," IEEE ICASSP ©2004, 4 pgs.

Smarthome, "IR Extender Expands Your IR Capabilities," 3 pages http://www.smarthome.com/8121.html, printed Apr. 22, 2009.

Soohuan, Kim, et al., "Block-based face detection scheme using face color and motion estimation," Real-Time Imaging VIII; Jan. 20-22, 2004, San Jose, CA; vol. 5297, No. 1; Proceedings of the SPIE—The International Society for Optical Engineering SPIE-Int. Soc. Opt. Eng USA ISSN: 0277-786X; pp. 78-88; XP007905596; 11pgs.

"Super Home inspectors or Super Inspectors," printed Mar. 18, 2010, 3 pages; http://www.umrt.com/PageManager/Default.aspx/PogeID=2120325.

Total immersion, Video Gallery, copyright 2008-2009 [retrieved Feb. 26, 2009], http://www.t-immersion.com/en.video-gallery.36.html, 1 page.

Trucco, E., et al., "Real-Time Disparity Maps for Immersive 3-D Teleconferencing by Hybrid Recursive Matching and Census Transform," 9 pages; retrieved and printed from the website on May 4, 2010 from http://server.cs.ucf.edu/~vision/papers/VidReg-final.pdf.

Tsapatsoulis, N., et al., "Face Detection for Multimedia Applications," Proceedings of the ICIP '00; Vancouver, BC, Canada; Sep. 2000; 4 pages.

Tsapatsoulis, N., et al., "Face Detection in Color Images and Video Sequences," $10^{th}$ Mediterranean Electrotechnical Conference (MELECON), 2000; vol. 2; pp. 498-502; 21 pgs.

Wang, Hualu, et al., "A highly Efficient System for Automatic Face Region Detection inMPEG Video," IEEE Transactions on Circuits and Systems for Video Technology; vol. 7, Issue 4; 1977 pp. 615-628.

Wilson, Mark, "Dreamoc 3D Display Turns Any Phone Into Hologram Machine," Oct. 30, 2008 [retrieved Feb. 24, 2009], http://gizmodo.com/5070906/dreamoc-3d-display-turns-any-phone-into-hologram-machine, 2 pages.

WirelessDevNet, Melody Launches Blutooth Over IP, http://www.wirelessdevnet.com/news/2001/ 155/news5.html; 2 pages, printed on Jun. 5, 2001.

WO 2008/118887 A3 Publication with PCT International Seach Report (4 pages), International Preliminary Report on Patentability (1 page), and Written Opinion of the ISA (7 pages); PCT/US2008/058079; dated Sep. 18, 2008.

Yang, Jie, et al., "A Real-Time Face Tracker," Proceedings $3^{rd}$ IEEE Workshop on Applications of Computer Vision; 1996; Dec. 2-4, 1996; pp. 142-147; 6 pgs.

Yang, Ming-Hsuan, et al., "Detecting Faces in Images: A Survey: A Survey," vol. 24, No. 1; Jan. 2002; pp. 34-58; 25 pgs.

Yoo, Byounghun, et al., "Image-Based Modeling of Urban Buildings Using Aerial Photographs and Digital Maps," Transactions in GIS, vol. 10 No. 3, p. 377-394, 2006; 18 pages [retrieved May 17, 2010], http://icad.kaist.ac.kr/publication/paper_data/image_based.pdf.

Arrington, Michael, "eJamming—Distributed Jamming," TechCrunch; Mar. 16, 2006; http://www.techcrunch.com/2006/03/16/ejamming-distributed-jamming/; 1 page.

Beesley, S.T.C., et al., "Active Macroblock Skipping in the H.264 Video Coding Standard," in Proceedings of 2005 Conference on Visualization, Imaging, and image Processing—VIIP 2005, Sep. 7-9, 2005, Benidorm, Spain, paper 480-261. ACTA Press, ISBN: 0-88986-528-0; 5 pages.

Chan et al., "Experiments on Black-Matching Techniques for Video Coding," Multimedia Systems, vol. 2, 1994, pp. 228-241.

Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.ist.psu.edu/viewdoc/summary?doi=10.1.1.35.1287.

"Cisco Expo Germany 2009 Opening," Posted on YouTube on May 4, 2009; http://www.youtube.com/watch?v=SDKsaSlz4MK; 2 pages.

eJamming Audio, Learn More; [retrieved and printed on May 27, 2010] http://www.ejamming.com/learnmore/; 4 pages.

Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.

"France Telecom's Magic Telepresence Wall," Jul. 11, 2006; http://www.humanproductivitylab.com/archive_blogs/2006/07/11/france_telecoms_magic_telepres_1.php; 4 pages.

Guili D., et al., "Orchestral: A Distributed Platform for Virtual Musical Groups and Music Distance Learning over the Internet in javaTM Technology"; [retrieved and printed on Jun. 6, 2010] http://ieeexplore.ieee.org/stamp/stamp.jsp?tp=arnumber=778626; 2 pages.

He, L., et al., "The Virtual Cinematographer: A Paradigm for Automatic Real-Time Camera Control and Directing," Proc. SIGGRAPH, © 1996; http://research.microsoft.com/en-us/um/people/lhe/papers/siggraph96.vc.pdf; 8 pages.

Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.

Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.

Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.

Kim, Y.H., et al., "Adaptive mode decision for H.264 encoder," Electronics letters, vol. 40, Issue 19, pp. 1172-1173, Sep. 2004; 2 pages.

Lee, J. and Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/ljy_ICME2004.pdf; 4 pages.

Liu, Z., "Head-Size Equalization for Better Visual Perception of Video Conferencing," Proceedings, IEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.

Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.

"Opera Over Cisco TelePresence at Cisco Expo 2009, in Hannover Germany—Apr. 28, 29," posted on YouTube on May 5, 2009; http://www.youtube.com/watch?v=xN5jNH5E-38; 1 page.

Payatagool, Chris, "Orchestral Manoeuvres in the Light of Telelepresence," Telepresence Options, Nov. 12, 2008; http://www.telepresenceoptions.com/2008/11/orchestral_manoeuvres; 2pages.

PCT "International Search Report and the Written Opinion of the International Searching Authority, or the Declaration," PCT/US2010/026456, dated Jun. 29, 2010; 11 pages.

PCT Search Report for PCT Application No. PCT/US2009/064061 dated Feb. 11, 2010, 4 pages.

PCT Written Opinion for PCT Application No. PCT/US2009/064061 dated Feb. 23, 2010; 14 pages.

Pixel Tools "Rale Control and H.264: H.264 rate control algorithm dynamically adjusts encoder parameters," [retrieved and printed on Jun. 10, 2010] http://www.pixeltools.om/rate_control_paper.html; 7 pages.

Richardson, I.E.G., et al., "Fast H.264 Skip Mode Selection Using and Estimation Framework," Picture Coding Symposium, (Beijing, China), Apr. 2006; www.rgu.ac.uk/files/richardson_fast_skip_estimation_pcs06.pdf; 6 pages.

Satoh, Kiyohide et al., "Passive Depth Acquisition for 3D Image Displays", IEICE Transactions on Information and Systems, information Systems Society, Tokyo, JP, Sep. 1, 1994, vol. E77-D, No. 9, pp. 949-957.

Schroeder, Erica, "The Next Top Model—Collaboration," Collaboration, The Workspace; A New World of Communications and Collaboration, Mar. 9, 2009; http//blogs.cisco.com/collaboration/comments/the_next_top_model; 3 pages.

Shum, H.-Y, et al., "A Review of Image-Based Rendering Techniques," in SPIE Proceedings vol. 4067(3); Proceedings of the Conference on Visual Communications and Image Processing 2000, Jun. 20-23, 2000, Perth, Australia: pp. 2-13; https://research.microsoft.com/pubs/68826/review_image_rendering.pdf.

Sonoma Wireworks Forums, "Jammin on Rifflink," [retrieved and printed on May 27, 2010] http://www.sonomawireworks.com/forums/viewtopic.php?id=2659; 5 pages.

Sonoma Wireworks Riffink. [retrieved and printed on Jun. 2, 2010] http://www.sonomawireworks.com/riffink.php; 3 pages.

Sullivan, Gary J., et al., "Video Compression—From Concepts to the H.264/AVC Standard," Proceedings IEEE, vol. 93, No. 1, Jan. 2005; http://ip.hhi.de/imagecom_G1/assets/pdfs/pieeee_sullivan_wiegand_2005.pdf; 14 pages.

Sun, X., et al., "Region of the Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.

Westerink, F.H., et al., "Two-pass MPEG-2 variable-bitrate encoding," IBM Journal of Research and Development, Jul. 1991, vol. 43, No. 4; http://citeseerx.ist.psu.edu/viewdoc/summary?doi=10.1.1.128.421; 18 pages.

Wiegand, T., et al., "Efficient mode selection for block-based motion compensated video coding," Proceedings, 2005 International Conference on Image Processing IIP 2005, pp. 2559-2562; citeseer.ist.psu.edu/wiegand95efficient.html.

Wiegand, T., et al., "Rate-distortion optimized mode selection for very low bit rate video coding and the emerging H.263 standard," IEEE Trans. Circuits Syst. Video Technol., Apr. 1996, vol. 6, No. 2, pp. 182-190.

Xin, Jun, et al., "Efficient macroblock coding-mode decision for H.264/AVC video coding," Technical Repot MERL 2004-079, Mitsubishi Electric Research Laboratories, Jan. 2004; www.merl.com/publications/TR2004-079/; 12 pages.

Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.

Isgro, Francesco et al., "Three-Dimensional Image Processing in the Future of Immersive Media," IEEE Transactions on Circuits and Systems for Video Technology, vol. 14, No. 3;XP011108796; ISSN:1051-8215; Mar. 1, 2004; pp. 288-303; 16 pages.

Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; 8 pages.

U.S. Appl. No. 13/096,772, filed Apr. 28, 2011, entitled "System and Method for Providing Enhanced Eye Gaze in a Video Conferencing Environment," Inventor(s): Charles C. Byers.

U.S. Appl. No. 13/106,002, filed May 12, 2011, entitled "System and Method for Video Coding in a Dynamic Environment," Inventors: Dihong Tian et al.

U.S. Appl. No. 13/098,430, filed Apr. 30, 2011, entitled "Sytem and Method for Transferring Transparency Information in a Video Environment," Inventors: Eddie Collins et al.
U.S. Appl. No. 13/096,795, filed Apr. 28, 2011, entitled "System and Method for Providing Enhanced Eye Gaze in a Video Conferencing Environment," Inventors: Charles C. Byers.
U.S. Design U.S. Appl. No. 29/389,651, filed Apr. 14, 2011, entitled "Video Unit With Integrated Features," Inventors(s): Kyle A. Buzzard et al.
U.S. Design U.S. Appl. No. 29/389,654, filed Apr. 14, 2011, entitled "Video Unit With Integrated Features," Inventor(s): Kyle A. Buzzard et al.
Dornaika F., et al., "Head and facial Animation Tracking Using Appearance-Adaptive Models and particle Filters," 20040627: 20040627-20040602, Jun. 27, 2004, 22 pages; Heudiasy Reasearch Lab, http://eprints.pascal-network.org/archive/00001231/01/rtvhci_chapter8.pdf.
EPO Aug. 15, 2011 Response to EPO Communication mailed Feb. 25, 2011 from European Patent Application No. 09725288.6; 15 pages.
Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.
Hammadi, Nait Charif et al., "Tracking the Activity of Participants in a Meeting," Machine Vision and Applications, Springer, Berlin, De Lnkd—DOI:10.1007/S00138-006-0015-5, vol. 17, No. 2, May 1, 2006, pp. 83-93, XP019323925 http://citeseer.ist.psu.edu/viewdoc/summary?doi=10.1.1.106.9832.
Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/GMAI.2006.34 Jul. 5, 2006, pp. 203-208; XP010927285 [Abstract Only].
PCT Sep. 25, 2007 Notification of Transmittal of the International Search Report from PCT/US06/45895.
PCT Sep. 2, 2008 International Preliminary Report on Patentability (1 page) and the Written Opinion of th ISA (4 pages) from PCT/US2006/045895.
PCT Sep. 11, 2008 Notification of Transmittal of the International Search Report from PCT/US07/09469.
PCT Nov. 4, 2008 International Preliminary Report on Patentability (1 page) and the Written Opinion of the ISA (8 pages) from PCT/US2007/009469.
PCT May 11, 2010 International Search Report from PCT/US2010/024059; 4 pages.
PCT Aug. 23, 2011 International Preliminary Report on Patentability and Written Opinion of the ISA from PCT/US2010/024059; 6 pages.
"Eye Tracking," from Wikipedia, (printed on Aug. 31, 2011) 12 pages; http://en.wikipedia.org/wiki/Eye_tracker.
"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.
Andreopoulos, Yiannis, et al., "In-Band Motion Compensated Temporal Filtering," Signal Processing: Image Communication 19 (2004) 653-673, 21 pages http://medianetlab.ee.ucla.edu/papers/011.pdf.
Arulampalam, M. Sanjeev, et al., "A Tutorial on Particle Filters for Online Nonlinear/Non-Gaussian Bayesian Tracking," IEEE Transactions on Signal Processing, vol. 50, No. 2, Feb. 2002, 15 pages http://www.cs.ubc.ca/~murphyk/Software/Kalman/ParticleFilterTutorial.pdf.
Boros, S., "Policy-Based Network Management with SNMP," Proceedings of the EUNICE 2000 Summer School Sep. 13-15, 2000, p. 3.
Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.
Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages; http://iphome.hhi.de/eisert/papers/vcip03.pdf.

Garg, Ashutosh, et al., "Audio-Visual ¦Speaker Detection Using Dynamic Bayesian Networks," IEEE International Conference on Automatic Face and Gesture Recognition, 2000 Proceedings, 7 pages http://www.ifp.illinois.edu/~ashutosh/papers/FG00.pdf.
U.S. Appl. No. 13/298,022, filed Nov. 16, 2011, entitled "System and Method for Alerting a Participant in a Video Conference," Inventor(s): TiongHu Lian, et al.
""Eye Gaze Response Interface Computer Aid (Erica) tracks eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html".
Gussenhoven, Carlos, "Chapter 5 Transcription of Dutch Intonation," Nov. 9, 2003, 33 pages; http://www.ru.nl/publish/pages/516003/todisun-ah.pdf.
Jong-Gook Ko et al., "Facial Feature Tracking and Head Orientation-Based Gaze Tracking," ITC-CSCC 2000, International Technical Conference on Circuits/Systems, Jul. 11-13, 2000, 4 pages; http://www.umiacs.umd.edu/~knkim/paper/itc-cscc-2000-jgko.pdf.
Lambert, "Polycom Video Communications," ©2004 Polycom, Inc., Jun. 20, 2004 http://www.polycom.com/global/documents/whitepapers/video_communications_h.239 _people_content_polycom_patented_technology.pdf.
Liu, Shan, et al., "Bit-Depth Scalable Coding for High Dynamic Range Video," SPIE Conference on Visual Communications and Image Processing, Jan. 2008; 12 pages http://www.merl.com/papers/docs/TR2007-078.pdf.
Nakaya, Y., et al. "Motion Compensation Based on Spatial Transformations," IEEE Transactions on Circuits and Systems for Video Technology, Jun. 1994, Abstract Only http://ieeexplore.ieee.org/Xplore/login.jsp?url=http%3A%2F%2Fieeexplore.ieee.org%2Fiel5%2F76%2F7495%2F00305878. pdf%3Farnumber%3D305878&authDecision=-203.
Patterson, E.K., et al., "Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf.
Perez, Patrick, et al., "Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480.
Potamianos, G., et a., "An Image Transform Approach for HMM Based Automatic Lipreading," in Proceedings of IEEE ICIP, vol. 3, 1998, 5 pages http://citeseerx.ist.psu.edu/viewdoc/summary?doi=10.1.1.13.6802.
Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.
Rikert, T.D., et al., "Gaze Estimation using Morphable models," IEEE International Conference on Automatic Face and Gesture Recognition, Apr. 1998; 7 pgs http://citeseer.ist.psu.edu/viewdoc/summary?doi=10.1.1.30.9472.
Tan, Kar-Han, et al., "Appearance-Based Eye Gaze Estimation," In Proceedings IEEE WACV'02, 2002, 5 pages http://citeseer.ist.psu.edu/viewdoc/summary?doi=10.1.1.19.8921.
Veratech Corp., "Phantom Sentinel," © VeratechAero 2006, 1 page; http://www.veratechcorp.com/phantom.html.
Vertegaal, Roel, et al., "GAZE-2: Conveying Eye Contact in Group Video Conferencing Using Eye-Controlled Camera Direction," CHI 2003, Apr. 5-10, 2003, Fort Lauderdale, FL; Copyright 2003 ACM 1-58113-630-07/03/0004; 8 pages; http://www.hml.queensu.ca/papers/vertegaalchi0403.pdf.
Weinstein et al., "Emerging Technologies for Teleconferencing and Telepresence," Wainhouse Research 2005 http://www.ivci.com/pdf/whitepaper-emerging-technologies-for-teleconferencing-and-telepresence.pdf.
Bakstein, Hynek, et al., "Visual Fidelity of Image Based Rendering," Center for Machine Perception, Czech Technical University, Proceedings of the Computer Vision, Winter 2004, http://www.benogo.dk/publications/Bakstein-Pajdla-CVWW04.pdf; 10 pages.

Cisco: Bill Mauchly and Mod Marathe; UNC: Henry Fuchs, et al., "Depth-Dependent Perspective Rendering," Apr. 15, 2008; 6 pages.

EPO Nov. 3, 2011 Communication from European Application EP10710949.8; 2 pages.

EPO Mar. 12, 2012 Response to EP Communication dated Nov. 3, 2011 from European Application EP10710949.8; 15 pages.

EPO Mar. 20, 2012 Communication from European Application 09725288.6; 6 pages.

"OptoIQ, ""Vision + Automation Products—VideometerLab 2,""" [retrieved and printed on Mar. 18, 2010], http://www.optoiq.com/optoiq-2/en-us/index/machine-vision-imaging-processing/display/vsd-articles-tools-template.articles.vision-systems-design.volume-11.issue-10.departments.new-products.vision-automation-products.htmlhtml; 11 pages".

Yang, Ruigang, et al., "Real-Time Consensus-Based Scene Reconstruction using Commodity Graphics Hardware," Department of Computer Science, University of North Carolina at Chapel Hill; 2002; http://www.cs.unc.edu/Research/stc/publications/yang_pacigra2002.pdf; 10 pages.

Chien et al., "Efficient moving Object Segmentation Algorithm Using Background Registration Technique," IEEE Transactions on Circuits and Systems for Video Technology, vol. 12, No. 7, Jul. 2002, 10 pages.

EPO Jul. 10, 2012 Response to EP Communication from European Application EP10723445.2.

EPO Sep. 24, 2012 Response to Mar. 20, 2012 EP Communication from European Application EP09725288.6.

\* cited by examiner

VIRTUAL ROUND-TABLE VIDEOCONFERENCE

FIELD OF THE INVENTION

The present invention relates to teleconferencing. More particularly, the present invention relates to multipoint videoconferencing. Specifically, embodiments according to the present invention relate to a system and method for maintaining eye contact thus creating a more realistic environment during multipoint videoconferences.

BACKGROUND

Multipoint videoconferencing is a natural extension of point-to-point video conferencing. Multipoint videoconferencing usually includes a multipoint video bridge combining the video signals from multiple videoconference endpoints to provide a single output video signal which can be displayed to and shared by all the participants. When there are a large number of participants in the videoconference, multipoint systems have difficulty maintaining an accurate perspective of the entire videoconference. Ideally, a participant should be able to view all other participants at the other endpoints. However, because of limited display space and a potential for a large number of participants, it is not always possible to display the video images of all participants in an image size that is useful to the viewers.

To account for this problem, designers have relied on many different methods. One prior art method is to limit the number of participants displayed at any one endpoint such that each image is large enough to be beneficial to the participants viewing them. As a participant speaks, her image is displayed at the other endpoints, replacing an existing image of a different participant. While this method has the advantage of displaying video of participants in an image size that is useful to other participants, it creates other problems. Because participants are not able to see all other participants at one time, a speaker must frequently address someone she cannot see. A speaker would often ask the person she is addressing to speak as a way of "tricking" the view switching algorithm, which may be based on audio activity, to switch the video image to the addressee.

Another prior art method used to deal with a large number of participants is to display the image of all participants. This "Hollywood Squares" approach, while giving participants the opportunity to see everyone in a videoconference, has its own problems. As the number of participants increases, the size of the individual images decreases making it more difficult for a participant to figure out who among the sea of faces is actually speaking.

While the current methods provide for some level of perspective in a multipoint videoconference, they do not create the perception that all participants are in the same room and leave speakers and audience members searching their displays for the right image.

Therefore, what is desired is a system and method that overcomes challenges found in the art, including a method for creating a more realistic videoconference environment allowing participants to all see each other at the same time and make eye contact with other participants without creating a "Hollywood Squares" effect.

SUMMARY OF THE INVENTION

In order to provide a realistic conference environment in a multipoint videoconference, it is desirable to have a system that can display video images of all participants at the same time. In one exemplary embodiment, a system is setup such that the meeting has the apparent geometry of a large round table, where each endpoint of the videoconference is a portion of the table.

In one exemplary embodiment of a method for practicing an aspect of the invention, a method for maintaining eye contact between participants of a multipoint conference is described. The method comprises creating a configuration of displays in an arch shape. Cameras are associated with each display so that when a participant at an endpoint looks at a particular display, the associated camera captures an image of the participant looking into and making eye contact with the associated camera. This image is displayed at other remote endpoint, giving the participants at the remote endpoint the visual effect of making eye contact with participants at other endpoints.

Additional advantages will be set forth in part in the description which follows or may be learned by practice. The advantages will be realized and attained by means of the elements and combinations particularly pointed out in the appended claims. It is to be understood that both the foregoing general description and the following detailed description are examples and explanatory only and are not restrictive, as claimed.

BRIEF DESCRIPTION OF THE DRAWINGS

The accompanying drawings, not drawn to scale, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, specific systems or to particular compositions, as such may, of course, vary. It is also to be understood that the terminology used herein is for the purpose of describing particular embodiments only and is not intended to be limiting.

As used in the specification and the appended claims, the singular forms "a", "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

"Exemplary" means "an example of" and is not intended to convey a meaning of an ideal or preferred embodiment.

The present methods and systems may be understood more readily by reference to the following detailed description of embodiments and the examples included therein and to the figures and their previous and following description.

Embodiments according to the invention can be understood in the context of a multipoint videoconferencing system where a plurality of endpoints are displayed as to create a virtual round table.

In accordance with the embodiments according to the present invention, each endpoint in the multipoint videoconference has a plurality of displays configured with an arch shaped table such that the table and displays form a virtual round table. Cameras are located near of the plurality of display configuration so that when a participant turns to view the images on a given display, the participant makes eye contact with the associated camera. For example, when a participant turns to the left to address the audience displayed in the left screen, the left side camera captures the participant making eye contact. This image is relayed to the remote endpoint sourcing the left side display where it is displayed on the rights side screen of the remote endpoint. Through this configuration, the two endpoints appear to be side by side to the participants at both endpoints.

Figure 1A:
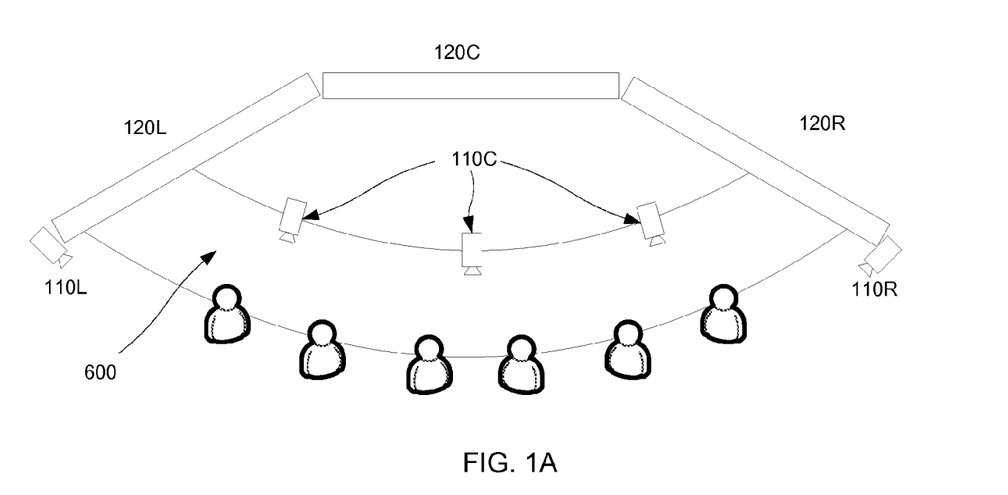
FIG. 1A illustrates an embodiment according to the present invention.

FIG. 1A illustrates a simplified non-limiting example of components according to one embodiment of the invention. A plurality of screens 120L, 120C, 120R are placed at predetermined angles to each other facing an arc shaped table 600. Wide angle cameras 110L, 110R are placed at the left and right sides of the plurality of screens to capture side views of the participants at the endpoint. Three center cameras 110C are used to capture close-up images of the participants and scaled and combined to create a composite image of all participants at an endpoint.

Note, while the illustration depicts the wide angle cameras 110R, 110L to be located to the left and right ends of the display configuration, this is not required to practice the invention. The wide angle cameras 110R, 110L may be placed in a plurality of locations as long as they are aligned such that when participants look to the left or right screens 120L, 120R, the wide angle cameras 110L, 110R capture the image of the participant making eye contact with the cameras 110L, 110R. Additionally, while the illustrations and description refer to a system with three displays, this is not required to practice the invention. The plurality of displays can consist of any number of displays depending on the needs of the user.

Figure 1B:
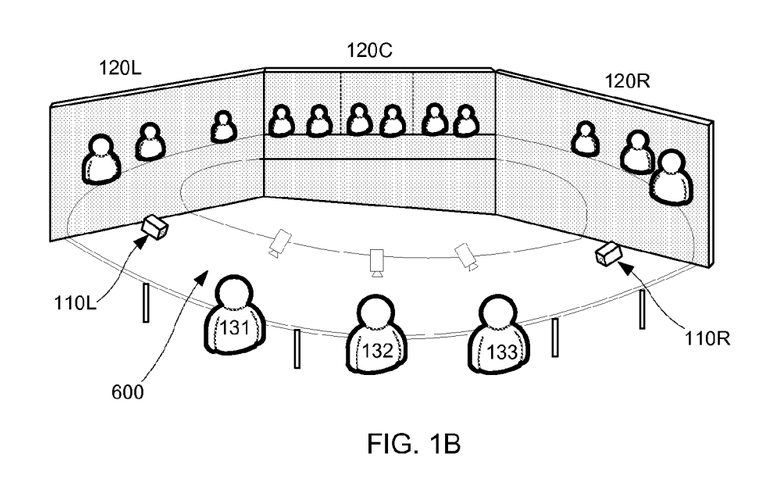
FIG. 1B illustrates a three dimensional embodiment according to the present invention.

FIG. 1B illustrates the exemplary system of FIG. 1A, including the possible images displayed on the display screens. In accordance with one embodiment according to the present invention, the image displayed on the left screen 120L is associated with the endpoint on the participants 131, 132, 133 virtual left. From the perspective of the participants in the image displayed in the left screen 120L, the participants 131, 132, 133 at the current endpoint appear to the virtual right. The image displayed on the center screen 120C is a scaled composite image of the participants from a third endpoint. The image displayed on the right screen 120R is associated with the endpoint on the participants 131, 132, 133 virtual right. From the perspective of the participants in the image displayed in the right screen 120R, the participants 131, 132, 133 at the current endpoint appear to the virtual left.

Figure 2:
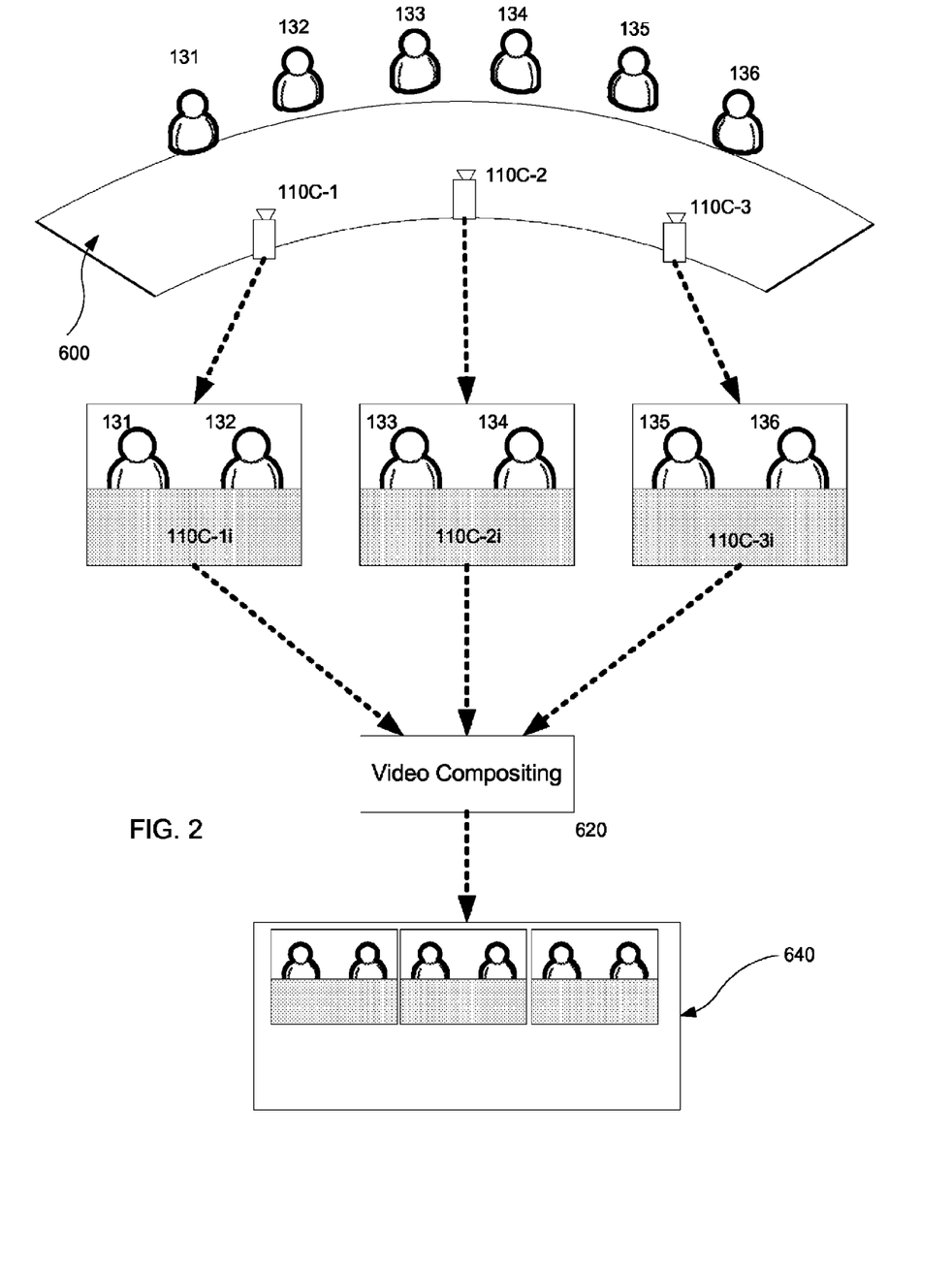
FIG. 2 illustrates an embodiment according to the present invention showing video scaling and compositing and the generated macro view.

FIG. 2 illustrates a simplified non-limiting example of a center composite image, comprised of a plurality of close-up images. The center close up cameras 110C-1, 110C-2, 110C-3 are each configured to capture an image 110C-1$i$, 110C-2$i$, 110C-3$i$ of one or more participants. Through the usage of scaling and compositing methods known to practitioners of the art, in step 620 the three images 110C-1$i$, 110C-2$i$, 110C-3$i$ are incorporated into a single image 640.

Figure 3:
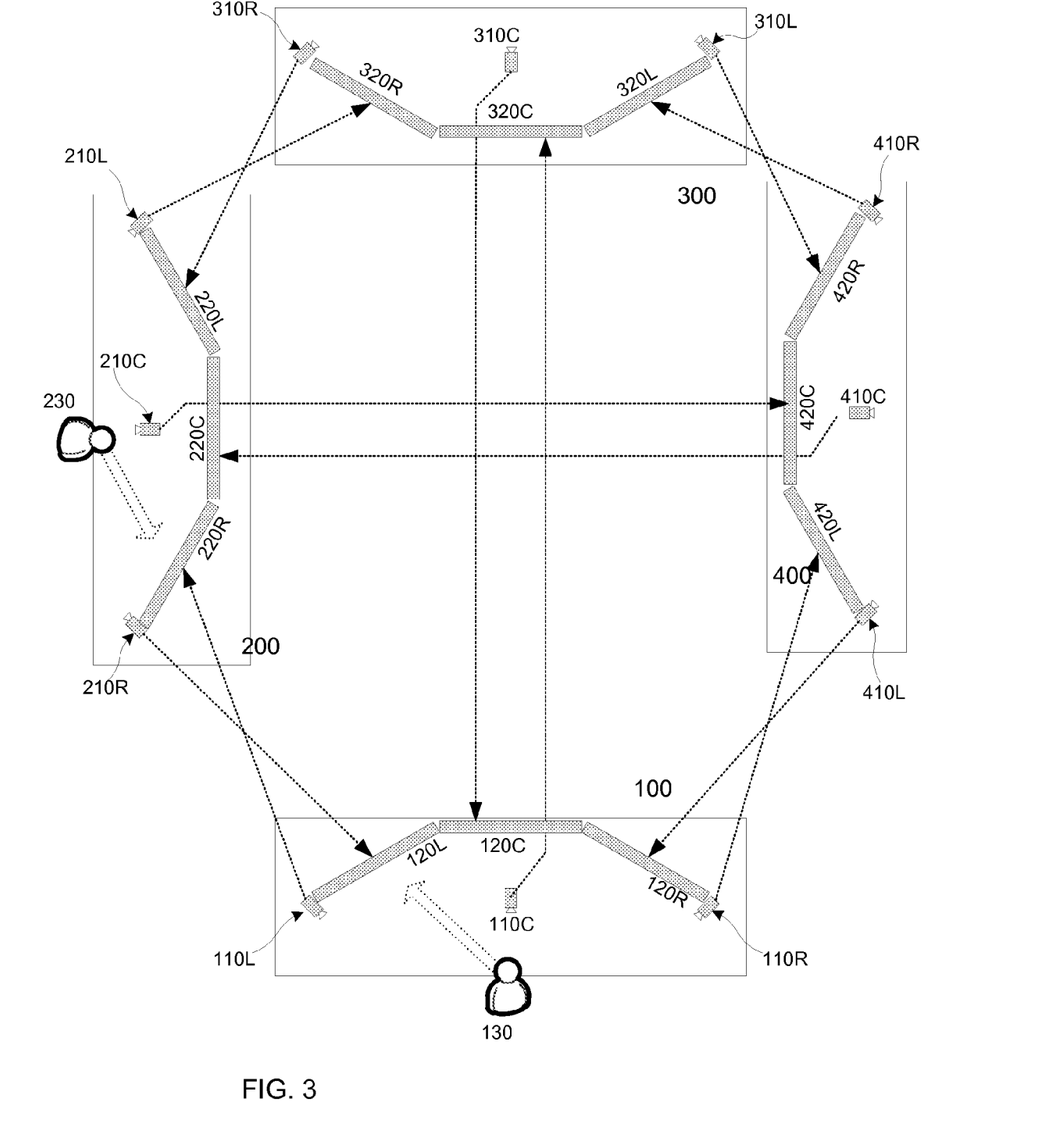
FIG. 3 illustrates an embodiment according to the present invention showing the relationship of the displays and cameras between the plurality of endpoints.

FIG. 3 illustrates a simplified non-limiting example of an embodiment according to the present invention with four endpoints. The center screens 120C, 220C, 320C, 420C display composite images from the opposite endpoints close up cameras 310C, 410C, 110C, 210C. Left side screens 120L, 220L, 230L, 420L use the wide angle right side cameras 210R, 310R, 410R, 110R of the endpoints 200, 300, 400, 100 on their virtual left. Right side screens 120R, 220R, 320R, 420R use the wide angle left side cameras 410L, 110L, 210L, 310L of the endpoints 400, 100, 200, 300 on their virtual right.

Through creating a virtual round table where each endpoint comprises a portion of the table, participants at remote locations have a more natural environment in which to conduct a videoconference. In accordance with the embodiments according to the present invention, participants at one endpoint 100 looks straight ahead at the center screen 120C to talk to one endpoint 300, looks to the right side screen 120R to talk to a second endpoint 400, and looks to the left side screen 120L to talk to the third endpoint 200. Cameras associated with the various screens, 120L, 120R, 120C capture the image of the participants looking directly into the camera, creating the appearance of eye contact with participants at other endpoints.

Figure 4:
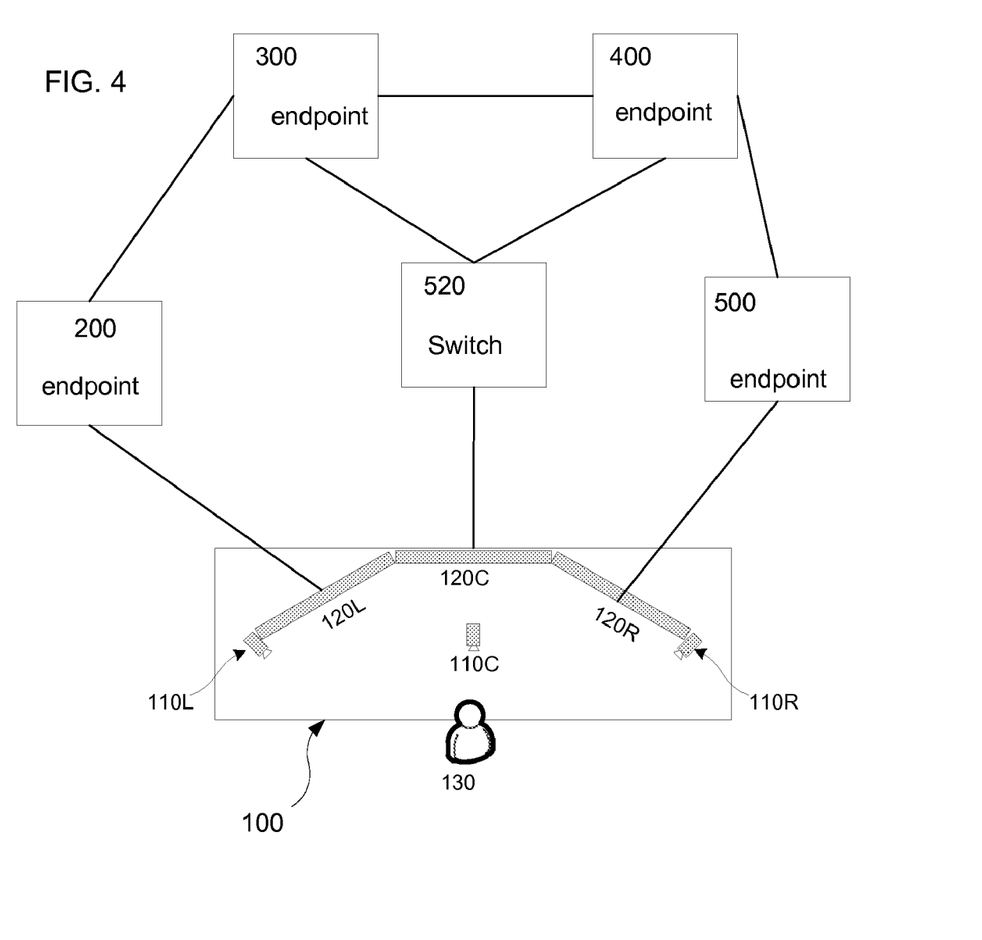
FIG. 4 illustrates an embodiment according to the present invention showing video connections for one endpoint when there are more endpoints than the number of displays available at each endpoint.
Figure 5:
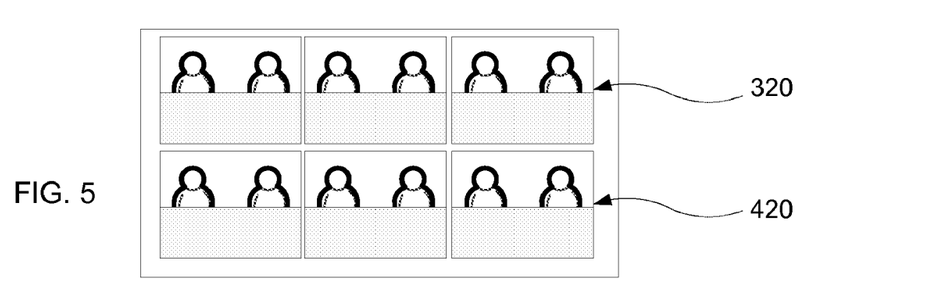
FIG. 5 illustrates an embodiment according to the present invention showing a video image displayed at an endpoint when there are more endpoints in a videoconference than the number of displays at the endpoint.

FIG. 4 illustrates a simplified non-limiting embodiment according to the invention of a multipoint videoconference where there are more endpoints than display screens. Note, this illustration shows one of a plurality of possible examples and can be applied to situations where there are more than five endpoints. In accordance with the embodiments according to the present invention, the number of displays at each endpoint may be equal to the total number of endpoints in a plurality of endpoints. For instance, in a five endpoint videoconference, an additional center display screen may be added to the system described in FIG. 3 with the fifth endpoint being virtually inserted into the virtual roundtable between the plurality of existing endpoints 100, 200, 300, 400 in FIG. 3. However, there is a possibility that there may be more endpoints then display screens in a videoconference. In an embodiment of the invention, when there is one endpoint more than display screens available, the images of endpoints 300, 400 not on the virtual left or right of a given endpoint 100 is displayed on the center screen 120C. FIG. 5 illustrates this configuration with the top image 320 being from one endpoint 300 and the lower image 420 being from the second endpoint 400.

In another embodiment of the invention, when there are more endpoints than the number of display screens 120L, 120R, 120C available at each endpoint, a general solution is to employ endpoint switching. In this embodiment of the invention, the endpoints in the videoconference are all connected in a virtual ring. The left screen 120L for the endpoint 100 is connected to the right side camera of the remote endpoint 200 to the virtual left. The right screen 120R for the endpoint 100 is connected to the left side camera of the remote endpoint 500 to the virtual right. The left and right screen's image sources remain constant during the videoconference. The center screen 120C switches between the endpoints not being displayed on the left or right screen 120L, 120R, using the composite image generated from the close-in center cameras of the endpoints 300, 400. A switch 520 controls which video image is currently being displayed on the center screen 120C. A plurality of algorithms known in the prior art may be used to control the switching of the two center images. For example, the center screen image may be based on the endpoint 300, 400 with a participant that has most recently spoken, or the image may be based on manual selection at the plurality of endpoints 100, 200, 300, 400, 500. For practical reasons, conferences rarely include large numbers of endpoints. The solution provided above preserves the effective eye-contact for the two fixed left and right side screens 120L, 120R.

Note, the non-limiting examples described above uses a three display system. However, the invention is not limited to three displays. For example, in an embodiment, there could include more than one center display. Additionally, in another embodiment, there could be one display where the left, right and center view images are scaled and composited into one image.

Figure 6:
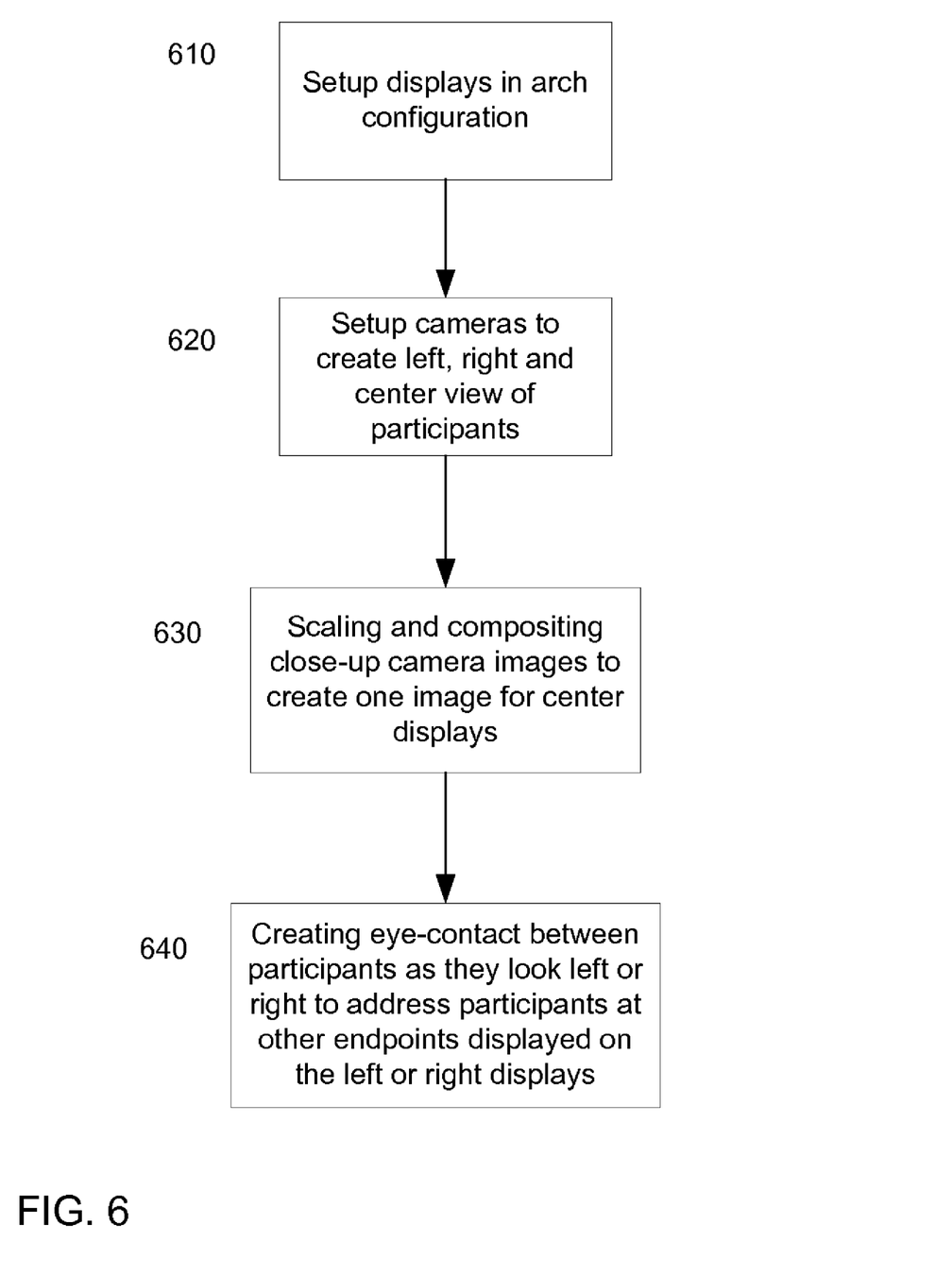
FIG. 6 illustrates an exemplary flow chart describing the steps to implement the method used by the videoconference system, according to one embodiment.

FIG. 6 illustrates an exemplary flow chart describing the steps needed to implement the method used by the videoconference system, according to one embodiment. In step 610, to create left, right and center views, a plurality of displays are setup in an arch configuration such that participants at an endpoint turns to the left, right or center when looking at displays showing the images of participants at other endpoints. To capture the image of participants as they look at left, right or center displays, in step 620, cameras are setup such that when a participant looks at the left, right or center display, one of the plurality of cameras captures the participant's gaze, making eye contact with the camera. In step 630, a center view for center displays can be created by one camera or by scaling and compositing close-up images from a plurality of cameras. In step 640, when a participant looks left, right or center to view other participants at a remote endpoint, the camera associated with the left, right or center view captures the image of the participant looking directly at the camera. This image is operably connected to the same endpoint being viewed on the left, right or center display. Thus, when a participant looks to the left display, a left side camera captures the image of the participant looking into the camera. This image is then displayed at the endpoint sourcing the left display creating the effect of the participants making eye contact with each other.

In an embodiment of the invention, to further enhance the virtual effects of the invention, audio speakers may be associated with the plurality of display screens. Referring to FIG. 3, when a participant 230 at an endpoint 200 speaks, the participant's 230 voice is relayed to an audio speaker associated with the display screen 120L currently showing the participant's 230 image. In associating the audio with the video image, a participant's 130 attention, at a remote endpoint 100, will be naturally drawn to the video image associated with the source of the audio.

In accordance with embodiments of the invention, the wide angle and composite images of participants may be used in addition to a plurality of other viewing options. For example, when a participant at one endpoint speaks for a sufficiently long duration, the display showing the wide angle or composite image of the participant's endpoint may switch to a close-up image of the participant from one of the center cameras. The close up images may also be used as part of manual selection by a participant.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as examples only, with a true scope and spirit being indicated by the following claims.

What is claimed is:

1. A method for creating a virtual illusion of meeting around a continuous table for a multipoint video conference comprising:
    showing, on a display system, a center perspective image of participants in a plurality of remote endpoints using a scaled and composited image of participants at the plurality of remote endpoints;
    showing, on a display system, a left side perspective image of a plurality of participants at a first remote endpoint; and
    showing, on the display system, a right side perspective image of a plurality of participants at a second remote endpoint.

2. The method of claim 1, wherein using the scaled and composited image of participants at the plurality of remote endpoints comprises scaling the image such that participants shown in the center perspective image appear visually farther away than those at the right or left side of the display system.

3. The method of claim 1, wherein showing, on the display system, the left side perspective image of the plurality of participants at the first remote endpoint comprises displaying on a right side of the display system the left side perspective image of the participants at the first remote endpoint.

4. The method of claim 1, wherein showing, on the display system, the right side perspective image of the plurality of participants at the second remote endpoint comprises displaying on a left side of the display system the right side perspective image of the participants at the second remote endpoint.

5. The method of claim 3, wherein displaying on the right side of the display system the left side perspective image of the participants at the first remote endpoint comprises displaying the left side perspective image such that participants in the left side perspective image nearer to the center portion of the display system appear visually farther away than those at the right side of the display system.

6. The method of claim 4, wherein displaying on the left side of the display system the right side perspective image of the participants at the second remote endpoint comprises displaying the right side perspective image such that participants in the right side perspective image nearer to the center portion of the display system appear visually farther away than those at the left side of the display system.

7. The method of claim 1, wherein the display system comprises a plurality of displays configured in an arc pattern such that the images on the display system in combination with a table creates the illusion of the continuous table.

8. The method of claim 1, wherein the display system comprises one display configured to display the center, left and right perspectives such that the images on the display system in combination with the table creates the illusion of the continuous table.

9. The method of claim 1 further comprising providing directional sound for audio signals associated with each remote endpoint to draw the attention of participants to a new speaker when the participants are not looking at an image associated with the new speaker.

10. The method of claim 9, wherein providing directional sound for audio signals associated with each remote endpoint to draw the attention of participants to a new speaker when the participants are not looking at the image associated with the new speaker further comprises:
   locating a plurality of audio speakers near a display system; and
   associating the source for the audio speaker with the image being displayed on the display system.

11. A system for creating a virtual illusion of meeting around a continuous table for a multipoint video conference comprising:
   a network; and
   a plurality of endpoints operably connected to the network wherein an endpoint is configured to:
      display, on a display system, a center perspective image of participants in a plurality of remote endpoints using a scaled and composited image of participants at the plurality of remote endpoints;
      display, on the display system, a left side perspective image of a plurality of participants at a first endpoint; and
      display, on the display system, a right side perspective image of a plurality of participants at a second endpoint.

12. The system of claim 11, wherein the endpoint is configured to display the center perspective image of participants in the plurality of endpoints comprises the endpoint being further configured to display the center perspective image generally in the center of a display system.

13. The system claim of 11, wherein the endpoint is configured to display the center perspective image of participants in the plurality of endpoints comprises the plurality of endpoints being configured to use scaled and composited images of participants at the plurality of remote endpoints such that the participants shown in the center perspective image appear visually farther away than those at the right or left side of the display system.

14. The system of claim 11, wherein the endpoint is configured to display the left side perspective image of the plurality of participants at the first endpoint comprises the endpoint being further configured to display on a right side of the display system, the left side perspective image of the participants at the first endpoint.

15. The system of claim 11, wherein the endpoint is configured to display the right side perspective image of the plurality of participants at the second endpoint comprises the endpoint being further configured to display on a left side of the display system, the right side perspective image of the participants at the second endpoint.

16. The system of claim of 14, wherein the endpoint is configured to display on the right side of the display system, the left side perspective image of the participants at the first endpoint comprises the endpoint being further configured to display the left side perspective image such that participants in the left side perspective image nearer to a center portion of the display system appear visually farther away than those at the right side of the display system.

17. The system of claim 15, wherein the endpoint is configured to display on the left side of the display system, the right side perspective image of the participants at the second endpoint comprises the endpoint being further configured to display the right side perspective image such that participants in the right side perspective image nearer to the center portion of the display system appear visually farther away than those at the left side of the display system.

18. The system of claim 11, wherein the display system comprises a plurality of displays configured in an arc pattern such that the images on the display system in combination with a table creates the illusion of the continuous table.

19. The system of claim 11, wherein the display system comprises one display configured to display the center, left and right perspectives such that the images on the display system in combination with the table creates the illusion of the continuous table.

* * * * *